US007196823B2

(12) United States Patent
Hagai et al.

(10) Patent No.: US 7,196,823 B2
(45) Date of Patent: Mar. 27, 2007

(54) METHOD OF CREATING LOOKUP TABLE FOR COLOR CONVERSION

(75) Inventors: Naoki Hagai, Komaki (JP); Masashi Kuno, Ohbu (JP); Masaki Kondo, Toyoake (JP); Masashi Ueda, Nagoya (JP); Masahiro Nishihara, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 920 days.

(21) Appl. No.: 10/301,568

(22) Filed: Nov. 22, 2002

(65) Prior Publication Data
US 2003/0095274 A1 May 22, 2003

(30) Foreign Application Priority Data
Nov. 22, 2001 (JP) .............................. 2001-357677

(51) Int. Cl.
*G06K 15/00* (2006.01)
(52) U.S. Cl. ...................... 358/3.23; 358/1.9; 358/525; 345/601; 345/602; 345/604; 345/606
(58) Field of Classification Search ................. 358/1.9, 358/3.23, 525; 345/601–604, 606, 475
See application file for complete search history.

(56) References Cited

U.S. PATENT DOCUMENTS

| 5,121,196 A | 6/1992 | Hung |
| 5,583,666 A | 12/1996 | Ellson et al. |
| 5,699,491 A | 12/1997 | Barzel |
| 5,712,925 A | 1/1998 | Ohga |
| 5,724,443 A | 3/1998 | Nishikawa |
| 6,532,081 B1* | 3/2003 | Cecchi et al. ................ 358/1.9 |
| 6,636,628 B1* | 10/2003 | Wang et al. ................ 382/167 |
| 6,773,175 B2* | 8/2004 | Yamamoto ................... 400/61 |
| 7,019,868 B2* | 3/2006 | Chang et al. ................ 358/2.1 |
| 7,054,033 B2* | 5/2006 | Namikata .................... 358/1.9 |

FOREIGN PATENT DOCUMENTS

| JP | A 6-98161 | 4/1994 |
| JP | A 11-308469 | 11/1999 |
| JP | A 2000-134490 | 5/2000 |

* cited by examiner

*Primary Examiner*—Kimberly Williams
*Assistant Examiner*—Beniyam Menberu
(74) *Attorney, Agent, or Firm*—Oliff & Berridge, PLC

(57) ABSTRACT

After determining a CMYK-to-Lab relationship, a Lab lattice-to-CMYK relationship is determined. The Lab lattice-to-CMYK relationship defines, for each Lab lattice point, a plurality of allowable CMYK data sets. Then, for each Lab lattice point, several allowable CMYK data sets with the largest K value are first selected among the plurality of CMYK data sets. Then, one CMYK data set with the smallest color distance from the subject Lab lattice point is selected among the several allowable CMYK data sets. If the subject Lab lattice point falls within the color reproducible range for the value of K of the selected CMYK data set, the selected CMYK data set is finally determined for the subject Lab lattice point. It is possible to create a lookup table, in which each Lab lattice point falls within the color range of the K value in the corresponding CMYK data set.

26 Claims, 8 Drawing Sheets

FIG.5(A)

CMYK-TO-Lab RELATIONSHIP

| (C, M, Y, K) | (L*, a*, b*) |
|---|---|
| (0, 0, 0, 0) | ( , , ) |
| ⋮ | ⋮ |
| (C, M, Y, K) | (L*, a*, b*) |
| ⋮ | ⋮ |
| (255, 255, 255, 255) | ( , , ) |

FIG.5(B)

Lab LATTICE-TO-CMYK RELATIONSHIP

| Lab LATTICE POINT ($L_n^*$, $a_n^*$, $b_n^*$) | (C, M, Y, K) CLOSE TO Lab LATTICE POINT |
|---|---|
| (0, -128, -128) | ( , , ), ( , , ), ⋯, ( , , ) |
| ⋮ | ⋮ |
| ($L_n^*$, $a_n^*$, $b_n^*$) | ($C_0$, $M_0$, $Y_0$, $K_0$), ($C_1$, $M_1$, $Y_1$, $K_1$), ⋯, ($C_m$, $M_m$, $Y_m$, $K_m$) |
| ⋮ | ⋮ |
| (100, 128, 128) | ( ), ( ), ⋯, ( ) |

METHOD OF CREATING LOOKUP TABLE FOR COLOR CONVERSION

BACKGROUND OF THE INVENTION

1. Field of the Invention

The present invention relates to a method of creating a lookup table that is used to convert color values into color signals with discrete values. The present invention also relates to a method and apparatus of color conversion using the lookup table.

2. Description of Related Art

Color conversion with a lookup table is commonly used when attempting to achieve conformity in colors outputted by different devices. Such color conversion achieves color matching on two different devices by mapping colors in a device-independent uniform color space.

A typical uniform color space is the CIEL*a*b* (hereinafter simply called L*a*b*) space. The L*a*b* space is a three-dimensional color space, as is the RGB color space used by monitors and other devices. Since both L*a*b* and RGB are three-dimensional color spaces, it is possible to convert one color on one color space into one color on the other color space.

SUMMARY OF THE INVENTION

In contrast, printers and other devices employ a four-dimensional color space having the colors of cyan, magenta, yellow, and black (hereinafter abbreviated to CMYK). Accordingly, several CMYK signal sets (C, M, Y, K) exist for a single L*a*b* value set (L*, a*, b*). It is necessary to execute some selection process to select one of the several CMYK signal sets in order to convert the L*a*b* value set into a single CMYK signal set.

FIG. 1 illustrates a part of the L*a*b* color space. The L*a*b* color space is divided into a lattice space, in which a plurality of Lab lattice points are defined. Although the L*a*b* color space is three-dimensional, the color space is rendered two-dimensionally for illustrative purposes. FIG. 1 additionally shows four broken lines for K of 52, 53, 54, and 55, respectively. Each broken line indicates a boundary between the area (lower area) of the L*a*b* color space that can be reproduced by a plurality of CMYK data sets with a corresponding K value and the area (upper area) that cannot. For example, a color reproducible range S for K of 55 is indicated by the shading lines in the drawing. On the boundary line for each value K, a plurality of dots D are shown. The plurality of dots D indicate a plurality of L*a*b* color points to be reproduced by a plurality of CMYK data sets with the corresponding K value. Although not shown in the drawing, in the reproducible area lower than the boundary line of each value K, there exist a plurality of L*a*b* color points reproduced by a plurality of CMYK data sets with the corresponding value K. Accordingly, in order to reproduce color of an arbitrary Lab color point that is located in the overlapped region of the reproducible areas of several different K values, it is possible to use several CMYK data sets with those several different K values.

The lookup table has to be created to store, for each Lab lattice point, a single CMYK data set that reproduces color whose Lab color point is located within an allowable color distance $\Delta Eab$. It is noted that a color distance $\Delta Eab$ between two arbitrary color points $(L1^*, a1^*, b1^*)$ and $(L2^*, a2^*, b2^*)$ has a value satisfying the following equation:

$$\Delta Eab = \{(L1^*-L2^*)\times(L1^*-L2^*)+(a1^*-a2^*)\times(a1^*-a2^*)+(b1^*-b2^*)\times(b1^*-b2^*)\}^{1/2}$$

For example, as shown in FIG. 1, several Lab color points for CMYK data sets with K of 52, 53, 54, and 55 exist within the circle F which has a lattice point P as the center and which has a radius of the allowable color distance $\Delta Eab$. It is therefore known that the color of the lattice point P can be reproduced by using those several CMYK data sets located within the circle F. In order to create the lookup table, it is necessary to select, for the Lab lattice point P, a single CMYK data set among the several CMYK data sets with K of 52, 53, 54, and 55.

It is conceivable to select one CMYK data set A whose K value is the largest among the several CMYK data sets. This conceivable method is effective for using the maximum possible overall color range of a device, such as a printer, as well as improving the gradation characteristics of K.

However, even though the point A for K of 55 is in the range F of the Lab lattice point P, the Lab lattice point P is outside the color reproducible range S for K of 55. Accordingly, if the CMYK data set for point A (K=55) is used to reproduce the Lab point P, the precision of color reproduction decreases both in theory and in actual measurement. More specifically, if a lookup table is produced according to the conceivable method with the allowable color distance $\Delta Eab$ being set to 3, for example, the color distance $\Delta Eab$ between each Lab lattice point and a corresponding CMYK data set (C, M, Y, K) in the lookup table will become as large as about 2.5. when actually controlling a printer with each CMYK data set in this conceivable lookup table to print a color patch and measuring the color patch, the measured Lab value will have a color distance $\Delta Eab$ (recovery precision) of as large as about 5.2 from the corresponding Lab lattice point. Such a precision of color reproduction is low.

In view of the above-described drawbacks, it is an object of the present invention to provide a lookup table that is improved in color reproduction accuracy for color conversion and a method of creating the same. It is another object of the present invention to provide a method and apparatus of color conversion employing this lookup table.

In order to attain the above and other objects, the present invention provides a method of creating a lookup table indicating a relationship between each lattice point in an input color space and a color signal set in a target color space, the input color space being defined by several color components whose total number has a first value, the target color space being defined by several color-signal components, whose total number has a second value greater than the first value by a difference number and each of which has one of a plurality of discrete values, the input color space being divided into a lattice to define a plurality of lattice points indicative of a plurality of lattice color sets, each lattice color set being constructed from color values of the several color components, a color value of each color component in the lattice color set having one of another plurality of discrete values, the color signal set being constructed from color values of the several color-signal components, the method comprising the steps of: determining one color signal set for each lattice point in the input color space, a color reproducible range being defined in the input color space and being determined dependently on a value of at least one color-signal component in the determined color signal set, the total number of the at least one color-signal component being greater than or equal to the difference number, the color reproducible range containing the subject lattice point and a color point of the determined color signal set therein, the subject lattice point being the closest to the color point of the determined color signal set within the color reproducible range; and setting, for each lattice point, the one color signal set determined for the subject lattice point, thereby creating the lookup table.

According to the lookup table created as described above, it is ensured that each lattice point always falls within the color reproducible range. Accordingly, it is possible to attain high color reproducing accuracy by using the lookup table.

The determining step may include: a variable-setting step of setting the at least one color-signal component as at least one variable for a color reproducible range function, the color reproducible range function indicating the color reproducible range that varies as the value of the at least one variable changes, the total number of the at least one variable being greater than or equal to the difference number; and a color signal-set determining step determining the one color signal set for each lattice point, the color reproducible range being determined by substituting the value of the at least one color-signal component in the determined color signal set for the at least one variable in the color reproducible range function.

It is noted that the input color space may be various types of color spaces, such as XYZ, Luv, and L*a*b*. The target color space may be various types of color spaces, such as RGB and CMYK. When the target color space is a CMYK color space, the variable setting process may set the black (K) color component as a variable for the color reproducible range function. In such a case, by simply using the signal value of K as the variable for the color reproducible range function, creation of the lookup table is simplified.

The method of the present invention may further comprise the steps of: receiving an input color value set indicative of a desired color point in the input color space; searching the lookup table to determine several lattice points that surround the desired color point; retrieving, from the lookup table, several color signal sets corresponding to the determined several lattice points; and calculating a color signal set based on the retrieved several color signal sets.

By performing color conversion using the lookup table created as described above, it is possible to reproduce colors with high accuracy.

According to another aspect, the present invention provides a method of creating a lookup table indicating a relationship between each lattice point in an input color space and a color signal set in a target color space, the input color space being defined by several color components whose total number has a first value, the target color space being defined by several color-signal components, whose total number has a second value greater than the first value by a difference number and each of which has one of a plurality of discrete values, the input color space being divided into a lattice to define a plurality of lattice points indicative of a plurality of lattice color sets, each lattice color set being constructed from color values of the several color components, a color value of each color component in the lattice color set having one of another plurality of discrete values, the color signal set being constructed from color values of the several color-signal components, the method comprising the steps of: setting, for each lattice point in the input color space, a plurality of allowable color signal sets indicative of a plurality of color points in the input color space that are distant from the subject lattice point by color distances smaller than or equal to a predetermined allowable distance in the input color space, at least one variable, which is constituted by at least one of the several color-signal components and whose total number is greater than or equal to the difference number, defining a color reproducible range function indicative of a color reproducible range that is defined in the input color space and that varies as the value of the variable changes; determining, for each lattice point in the input color space, one color signal set among the plurality of allowable color signal sets, a color reproducible range determined by substituting, for the at least one variable in the color reproducible range function, the value of the at least one color-signal component in the determined color signal set, containing the subject lattice point therein, a color difference between the subject lattice point and a color point of the determined color signal set being the smallest among several ones of the plurality of allowable color signal sets that have the same value for the at least one color-signal component; and setting, for each lattice point, the one color signal set determined for the subject lattice point, thereby creating the lookup table.

According to another aspect, the present invention provides a method of creating a lookup table indicating a relationship between each of a plurality of Lab lattice points (L*, a*, b*) defined in a predetermined L*a*b* color space and a CMYK color control signal set (C, M, Y, K), the L*a*b* color space being a three-dimensional color space defined by an L axis, an a axis, and a b axis that extend substantially perpendicularly with one another, the L*a*b* color space being divided into a lattice to define a plurality of Lab lattice points, each of the values C, M, Y, and K in the CMYK color control signal set (C, M, Y, K) having one of a plurality of discrete values, the method comprising the steps of: setting, for each Lab lattice point (L*, a*, b*), a plurality of allowable CMYK color control signal sets (C, M, Y, K) indicative of a plurality of Lab color points that are distant from the subject Lab lattice point (L*, a*, b*) by color distances smaller than or equal to a predetermined allowable distance in the L*a*b* color space; determining, for each Lab lattice point (L*, a*, b*), one CMYK color control signal set (C, M, Y, K) among the plurality of allowable CMYK color control signal sets (C, M, Y, K), the K value of the determined CMYK color control signal set (C, M, Y, K) defining, in the L*a*b* color space, a color reproducible range that contains the subject lattice point (L*, a*, b*) therein, a color difference between the subject lattice point (L*, a*, b*) and an Lab color point for the determined CMYK color control signal set (C, M, Y, K) being the smallest among several allowable CMYK color control signal sets (C, M, Y, K) that have the same value K with the determined CMYK color control signal set (C, M, Y, K) among the plurality of allowable CMYK color control signal sets (C, M, Y, K); and setting, for each Lab lattice point (L*, a*, b*), the one CMYK color control signal set (C, M, Y, K) determined for the subject one Lab lattice point (L*, a*, b*), thereby creating the lookup table.

According to the lookup table created as described above, each Lab lattice point (L*, a*, b*) always falls within the color reproducible range for the value K of the corresponding CMYK color control signal set (C, M, Y, K). Accordingly, it is possible to attain high color reproducing accuracy. It is also possible to provide good gradation for black.

According to a further aspect, the present invention provides a device of creating a lookup table indicating a relationship between each lattice point in an input color space and a color signal set in a target color space, the input color space being defined by several color components whose total number has a first value, the target color space being defined by several color-signal components, whose total number has a second value greater than the first value by a difference number and each of which has one of a plurality of discrete values, the input color space being divided into a lattice to define a plurality of lattice points indicative of a plurality of lattice color sets, each lattice color set being constructed from color values of the several color components, a color value of each color component in the lattice color set having one of another plurality of discrete values, the color signal set being constructed from color values of the several color-signal components, the device comprising: a portion determining one color signal set for each lattice point in the input color space, a color reproducible range being defined in the input color space and being determined dependently on a value of at least one color-signal component in the determined color signal set, the total number of the at least one color-signal component being greater than or equal to the difference number, the color reproducible range containing the subject lattice point and a color point of the determined color signal set therein, the subject lattice point being the closest to the color point of the determined color signal set within the color reproducible range; and a portion setting, for each lattice point, the one color is signal set determined for the subject lattice point, thereby creating the lookup table.

According to another aspect, the present invention provides a lookup table indicating a relationship between each lattice point in an input color space and a color signal set in a target color space, the input color space being defined by several color components whose total number has a first value, the target color space being defined by several color-signal components, whose total number has a second value greater than the first value by a difference number and each of which has one of a plurality of discrete values, the input color space being divided into a lattice to define a plurality of lattice points indicative of a plurality of lattice color sets, each lattice color set being constructed from color values of the several color components, a color value of each color component in the lattice color set having one of another plurality of discrete values, the color signal set being constructed from color values of the several color-signal components, the lookup table being produced by the steps of: determining one color signal set for each lattice point in the input color space, a color reproducible range being defined in the input color space and being determined dependently on a value of at least one color-signal component in the determined color signal set, the total number of the at least one color-signal component being greater than or equal to the difference number, the color reproducible range containing the subject lattice point and a color point of the determined color signal set therein, the subject lattice point being the closest to the color point of the determined color signal set within the color reproducible range; and setting, for each lattice point, the one color signal set determined for the subject lattice point, thereby creating the lookup table.

According to another aspect, the present invention provides a method of converting an input color value set defined in an input color space into a control signal set defined in a target color space, the method comprising: a step of creating a lookup table indicating a relationship between each lattice point in an input color space and a color signal set in a target color space, the input color space being defined by several color components whose total number has a first value, the target color space being defined by several color-signal components, whose total number has a second value greater than the first value by a difference number and each of which has one of a plurality of discrete values, the input color space being divided into a lattice to define a plurality of lattice points indicative of a plurality of lattice color sets, each lattice color set being constructed from color values of the several color components, a color value of each color component in the lattice color set having one of another plurality of discrete values, the color signal set being constructed from color values of the several color-signal components, the lookup table creating step including the steps of: determining one color signal set for each lattice point in the input color space, a color reproducible range being defined in the input color space and being determined dependently on a value of at least one color-signal component in the determined color signal set, the total number of the at least one color-signal component being greater than or equal to the difference number, the color reproducible range containing the subject lattice point and a color point of the determined color signal set therein, the subject lattice point being the closest to the color point of the determined color signal set within the color reproducible range; and setting, for each lattice point, the one color signal set determined for the subject lattice point, thereby creating the lookup table; receiving an input color value set indicative of a desired color point in the input color space; searching the lookup table to determine several lattice points that surround the desired color point; retrieving, from the lookup table, several color signal sets corresponding to the determined several lattice points; and calculating a color signal set based on the retrieved several color signal sets.

According to another aspect, the present invention provides a device of converting an input color value set defined in an input color space into a control signal set defined in a target color space, the device comprising: a portion creating a lookup table indicating a relationship between each lattice point in an input color space and a color signal set in a target color space, the input color space being defined by several color components whose total number has a first value, the target color space being defined by several color-signal components, whose total number has a second value greater than the first value by a difference number and each of which has one of a plurality of discrete values, the input color space being divided into a lattice to define a plurality of lattice points indicative of a plurality of lattice color sets, each lattice color set being constructed from color values of the several color components, a color value of each color component in the lattice color set having one of another plurality of discrete values, the color signal set being constructed from color values of the several color-signal components, the lookup table creating portion including: a portion determining one color signal set for each lattice point in the input color space, a color reproducible range being defined in the input color space and being determined dependently on a value of at least one color-signal component in the determined color signal set, the total number of the at least one color-signal component being greater than or equal to the difference number, the color reproducible range containing the subject lattice point and a color point of the determined color signal set therein, the subject lattice point being the closest to the color point of the determined color signal set within the color reproducible range; and a portion setting, for each lattice point, the one color signal set determined for the subject lattice point, thereby creating the lookup table; a portion receiving an input color value set indicative of a desired color point in the input color space; a portion searching the lookup table to determine several lattice points that surround the desired color point; a portion retrieving, from the lookup table, several color signal sets corresponding to the determined several lattice points; and a portion calculating a color signal set based on the retrieved several color signal sets.

BRIEF DESCRIPTION OF THE DRAWINGS

The above and other objects, features and advantages of the invention will become more apparent from reading the following description of a preferred embodiment taken in connection with the accompanying drawings in which:

FIG. 5(A) illustrates a CMYK-to-Lab relationship determined during a process for creating a lookup table according to the embodiment of the present invention;

FIG. 5(B) illustrates a Lab lattice-to-CMYK relationship determined during the lookup table creating process according to the embodiment of the present invention;

DETAILED DESCRIPTION OF THE PREFERRED EMBODIMENT

A method for creating a lookup table and a method and apparatus of color conversion employing the lookup table according to a preferred embodiment of the present invention will be described while referring to the accompanying drawings.

Figures 1, 3:
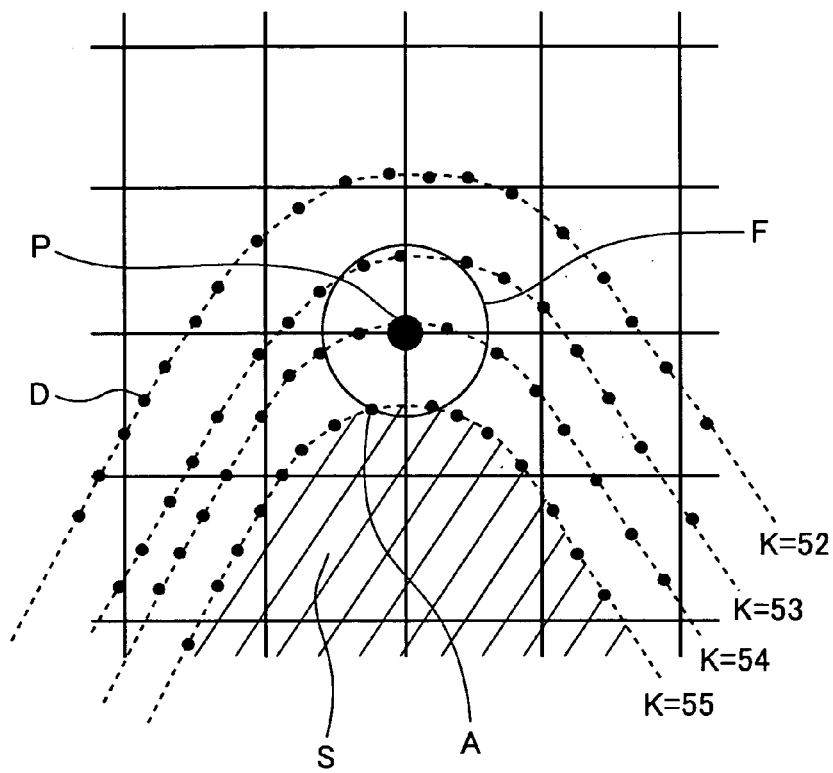
FIG. 1 is an explanatory diagram showing the conceivable method for creating a lookup table.
FIG. 3 illustrates a lookup table created according to the embodiment of the present invention.
Figure 2:
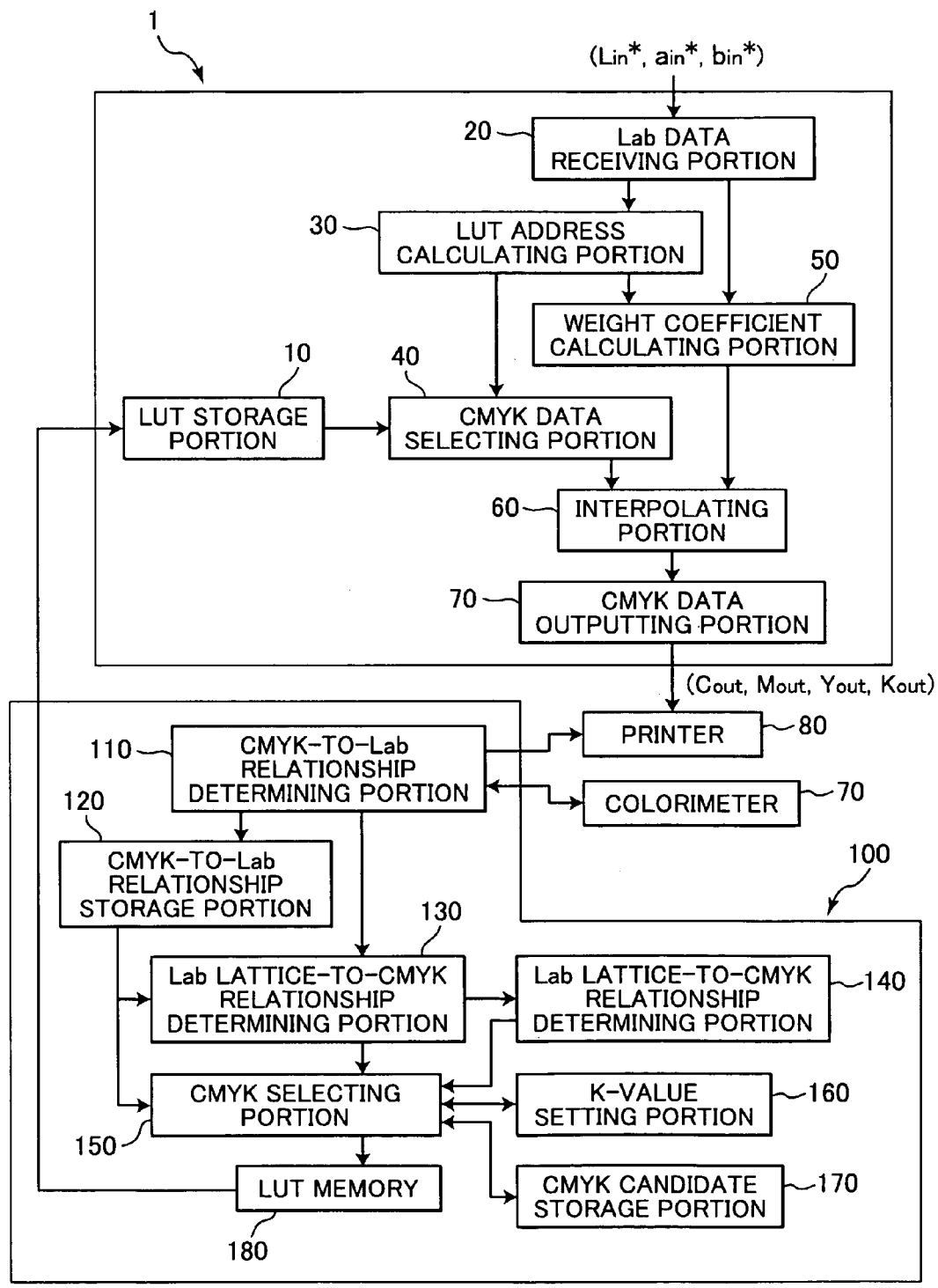
FIG. 2 is a functional block diagram showing a color conversion device and a lookup table creating device according to an embodiment of the present invention.

According to the present embodiment, a color conversion device 1 is constructed from a personal computer, and is connected to a printer 80 as shown in FIG. 2. The color conversion device 1 includes a LUT (lookup table) storage portion 10 storing a lookup table LUT shown in FIG. 3. The color conversion device 1 is for converting an arbitrary Lab color value set ($L_{in}^*$, $a_{in}^*$, $b_{in}^*$) into a CMYK color control signal set ($C_{out}$, $M_{out}$, $Y_{out}$, $K_{out}$), and for controlling the printer 80 by the CMYK color control signal set ($C_{out}$, $M_{out}$, $Y_{out}$, $K_{out}$) to reproduce a color represented by the original Lab color value set ($L_{in}^*$, $a_{in}^*$, $b_{in}^*$).

As shown in FIG. 3, the lookup table LUT indicates a relationship between a L*a*b* color space and a CMYK color space. The L*a*b* color space is defined by the three color components: L*, a*, and b*. The L*a*b* color space is a three-dimensional color space, wherein L*-, a*-, and b*-axes extend perpendicularly with one another. It is noted that "L*" takes on a continuous value from 0 to 100, "a*" takes on a continuous value from −128 to 128, and "b*" takes on a continuous value from −128 to 128. To create the lookup table LUT, the L*a*b* color space is divided into a lattice to define a plurality of different lattice points ($L_n^*$, $a_n^*$, $b_n^*$), wherein "$L_n^*$" takes on a discrete value of 0, 1, 2, . . . , and 100, "$a_n^*$" takes on a discrete value of −128, −127, −126, . . . , −2, −1, 0, 1, 2, . . . , 126, 127, and 128, and "$b_n^*$" takes on a discrete value of −128, −127, −126, . . . , −2, −1, 0, 1, 2, . . . , 126, 127, and 128. Thus, the total number of the lattice points ($L_n^*$, $a_n^*$, $b_n^*$) is 101×257×257.

Each lattice point ($L_n^*$, $a_n^*$, $b_n^*$) is surrounded by eight octants Qs (s=1–8). Each octant Qs (s=1–8) is defined as a space surrounded by the subject lattice point ($L_n^*$, $a_n^*$, $b_n^*$) and its neighboring seven lattice points. More specifically, a first octant Q1 is surrounded by the subject lattice point ($L_n^*$, $a_n^*$, $b_n^*$) and its neighboring seven lattice points ($L_n^*-1$, $a_n^*-1$, $b_n^*-1$), ($L_n^*-1$, $a_n^*-1$, $b_n^*$), ($L_n^*-1$, $a_n^*$, $b_n^*-1$), ($L_n^*-1$, $a_n^*$, $b_n^*$), ($L_n^*$, $a_n^*-1$, $b_n^*-1$), ($L_n^*$, $a_n^*-1$, $b_n^*$), ($L_n^*$, $a_n^*$, $b_n^*-1$). A second octant Q2 is surrounded by the subject lattice point ($L_n^*$, $a_n^*$, $b_n^*$) and its other neighboring seven lattice points ($L_n^*-1$, $a_n^*-1$, $b_n^*+1$), ($L_n^*-1$, $a_n^*-1$, $b_n^*$), ($L_n^*-1$, $a_n^*$, $b_n^*+1$), ($L_n^*-1$, $a_n^*$, $b_n^*$), ($L_n^*$, $a_n^*-1$, $b_n^*+1$), ($L_n$, $a_n^*-1$, $b_n^*$), ($L_n^*$, $a_n^*$, $b_n^*+1$). A third octant Q3 is surrounded by the subject lattice point ($L_n^*$, $a_n^*$, $b_n^*$) and its neighboring seven lattice points ($L_n^*-1$, $a_n^*+1$, $b_n^*-1$), ($L_n^*-1$, $a_n^*+1$, $b_n^*$), ($L_n^*-1$, $a_n^*$, $b_n^*-1$), ($L_n^*-1$, $a_n^*$, $b_n^*$), ($L_n^*$, $a_n^*+1$, $b_n^*-1$), ($L_n^*$, $a_n^*+1$, $b_n^*$), ($L_n^*$, $a_n^*$, $b_n^*-1$). A fourth octant Q4 is surrounded by the subject lattice point ($L_n^*$, $a_n^*$, $b_n^*$) and its other neighboring seven lattice points ($L_n^*-1$, $a_n^*+1$, $b_n^*+1$), ($L_n^*-1$, $a_n^*+1$, $b_n^*$), ($L_n^*-1$, $a_n^*$, $b_n^*+1$), ($L_n^*-1$, $a_n^*$, $b_n^*$), ($L_n^*$, $a_n^*+1$, $b_n^*+1$), ($L_n^*$, $a_n^*+1$, $b_n$), ($L_n^*$, $a_n^*$, $b_n^*+1$). A fifth octant Q5 is surrounded by the subject lattice point ($L_n^*$, $a_n^*$, $b_n^*$) and its neighboring seven lattice points ($L_n^*+1$, $a_n^*-1$, $b_n^*-1$), ($L_n^*+1$, $a_n^*-1$, $b_n^*$), ($L_n^*+1$, $a_n^*$, $b_n^*-1$), ($L_n^*+1$, $a_n^*$, $b_n^*$), ($L_n^*$, $a_n^*-1$, $b_n^*-1$), ($L_n^*$, $a_n^*-1$, $b_n^*$), ($L_n^*$, $a_n^*$, $b_n^*-1$). A sixth octant Q6 is surrounded by the subject lattice point ($L_n^*$, $a_n^*$, $b_n^*$) and its other neighboring seven lattice points ($L_n^*+1$, $a_n^*-1$, $b_n^*+1$), ($L_n^*+1$, $a_n^*-1$, $b_n^*$), ($L_n^*+1$, $a_n^*$, $b_n^*+1$), ($L_n^*+1$, $a_n^*$, $b_n^*$), ($L_n^*$, $a_n^*-1$, $b_n^*+1$), ($L_n^*$, $a_n^*-1$, $b_n^*$), ($L_n^*$, $a_n^*$, $b_n^*+1$). A seventh octant Q7 is surrounded by the subject lattice point ($L_n^*$, $a_n^*$, $b_n^*$) and its neighboring seven lattice points ($L_n^*+1$, $a_n^*+1$, $b_n^*-1$) ($L_n^*+1$, $a_n^*+1$, $b_n^*$), ($L_n^*+1$, $a_n^*$, $b_n^*-1$), ($L_n^*+1$, $a_n^*$, $b_n$), ($L_n^*$, $a_n^*+1$, $b_n^*-1$), ($L_n^*$, $a_n^*+1$, $b_n^*$), ($L_n^*$, $a_n^*$, $b_n^*-1$). An eighth octant Q8 is surrounded by the subject lattice point ($L_n^*$, $a_n^*$, $b_n^*$) and its other neighboring seven lattice points ($L_n^*+1$, $a_n^*+1$, $b_n^*+1$), ($L_n^*+1$, $a_n^*+1$, $b_n$), ($L_n^*+1$, $a_n^*$, $b_n^*+1$) ($L_n^*-1$, $a_n^*$, $b_n^*$), ($L_n^*$, $a_n^*+1$, $b_n^*+1$), ($L_n^*$, $a_n^*+1$, $b_n^*$) ($L_n^*$, $a_n^*$, $b_n^*+1$). In this way, the eight octants Qs (s=1–8) are defined by the subject lattice point ($L_n^*$, $a_n^*$, $b_n^*$) and its neighboring 26 lattice points ($L_n^*-1$, $a_n^*-1$, $b_n^*-1$), ($L_n^*-1$, $a_n^*-1$, $b_n^*$), ($L_n^*-1$, $a_n^*-1$, $b_n^*+1$), ($L_n^*-1$, $a_n^*$, $b_n^*-1$), ($L_n^*-1$, $a_n^*$, $b_n^*$), ($L_n^*-1$, $a_n^*$, $b_n^*+1$), ($L_n^*-1$, $a_n^*+1$, $b_n^*-1$), ($L_n^*-1$, $a_n^*+1$, $b_n^*$), ($L_n^*-1$, $a_n^*+1$, $b_n^*+1$), ($L_n^*$, $a_n^*-1$, $b_n^*-1$), ($L_n^*$, $a_n^*-1$, $b_n^*$), ($L_n^*$, $a_n^*-1$, $b_n^*+1$), ($L_n^*$, $a_n^*$, $b_n^*-1$), ($L_n^*$, $a_n^*$, $b_n^*+1$), ($L_n^*$, $a_n^*+1$, $b_n^*-1$), (Ln*, $a_n^*+1$, $b_n^*$), ($L_n^*$, $a_n^*+1$, $b_n^*+1$), ($L_n^*+1$, $a_n^*-1$, $b_n^*-1$), ($L_n^*+1$, $a_n^*-1$, $b_n^*$), ($L_n^*+1$, $a_n^*-1$, $b_n^*+1$), ($L_n^*+1$, $a_n^*$, $b_n^*-1$), ($L_n^*+1$, $a_n^*$, $b_n^*$), ($L_n^*+1$, $a_n^*$, $b_n^*+1$), ($L_n^*+1$, $a_n^*+1$, $b_n^*-1$), ($L_n^*+1$, $a_n^*+1$, $b_n^*$), ($L_n^*+1$, $a_n^*+1$, $b_n^*+1$).

The CMYK color space is defined by four color components: C, M, Y, and K, wherein C, M, Y, and K can each take on a discrete value of 0, 1, 2, . . . , and 255. The total number of combinations of the values of C, M, Y, and K is therefore $256^4$. The printer 80 can receive all the $256^4$ sets of CMYK color control signals (C, M, Y, K) where C, M, Y, and K are 0, 1, 2, . . . , and 255.

As shown in FIG. 3, the lookup table LUT lists up, for each of all the 101×255×255 number of Lab lattice points ($L_n^*$, $a_n^*$, $b_n^*$), a CMYK color control signal set (C, M, Y, K), with which the printer 80 will reproduce the color substantially the same as the color represented by the corresponding Lab lattice point ($L_n^*$, $a_n^*$, $b_n^*$).

As shown in FIG. 2, the color conversion device 1 includes: an Lab data receiving portion 20, an LUT address calculating portion 30, the LUT storage portion 10, a CMYK data selecting portion 40, a weight coefficient calculating portion 50, an interpolating portion 60, and a CMYK data outputting portion 70.

The Lab data receiving portion 20 is for receiving data of an arbitrary Lab value set ($L_{in}^*$, $a_{in}^*$, $b_{in}^*$) indicative of a desired color, wherein "$L_{in}^*$" is a value in the range of 0 to 100, "$a_{in}^*$" is a value in the range of −128 to 128, and "$b_{in}^*$" is a value in the range of −128 to 128. The Lab data receiving portion 20 can receive the Lab value set ($L_{in}^*$, $a_{in}^*$, $b_{in}^*$) from outside. Alternatively, the Lab data receiving portion 20 can receive the Lab value set ($L_{in}^*$, $a_{in}^*$, $b_{in}^*$) from another application software that is executed by the personal computer (color conversion device 1) to create the Lab data set ($L_{in}^*$, $a_{in}^*$, $b_{in}^*$).

The LUT storage portion 10 previously stores therein the lookup table LUT of FIG. 3. The lookup table LUT has a plurality of addresses indicative of the Lab lattice point data sets ($L_n^*$, $a_n^*$, $b_n^*$), and stores one CMYK control signal set (C, M, Y, K) at each address ($L_n^*$, $a_n^*$, $b_n^*$).

The LUT address calculating portion 30 is for selecting eight addresses indicative of eight Lab lattice points ($L_n^*$, $a_n^*$, $b_n^*$) that surround a color point indicated by the inputted Lab value set ($L_{in}^*$, $a_{in}^*$, $b_{in}^*$) in the L*a*b* space.

The CMYK data selecting portion 40 is for retrieving, from the selected eight addresses of the lookup table LUT, eight CMYK control signal sets (C, M, Y, K) that correspond to the eight lattice points ($L_n^*$, $a_n^*$, $b_n^*$).

The weight coefficient calculating portion 50 is for calculating weight coefficients, which will be used by the interpolating portion 60, based on the color distances between the input Lab value set ($L_{in}$, $a_{in}$, $b_{in}$) and the selected eight lattice points ($L_n^*$, $a_n^*$, $b_n^*$).

The interpolating portion 60 is for executing an interpolation calculation using the eight CMYK control signal sets (C, M, Y, K) and the several weight coefficients, in a well-known manner, to obtain one CMYK control signal set ($C_{out}$, $M_{out}$, $Y_{out}$, $K_{out}$).

The CMYK data outputting portion 70 is for outputting the CMYK control signal set ($C_{out}$, $M_{out}$, $Y_{out}$, $K_{out}$) to the printer 80. When the printer 80 is controlled by the CMYK color control signal ($C_{out}$, $M_{out}$, $Y_{out}$, $K_{out}$), the printer 80 reproduces a color substantially the same as the input Lab value set ($L_{in}^*$, $a_{in}^*$, $b_{in}^*$).

With the above-described configuration, the color conversion device 1 performs color-conversion process by using the lookup table LUT in a manner described below.

Figure 4:
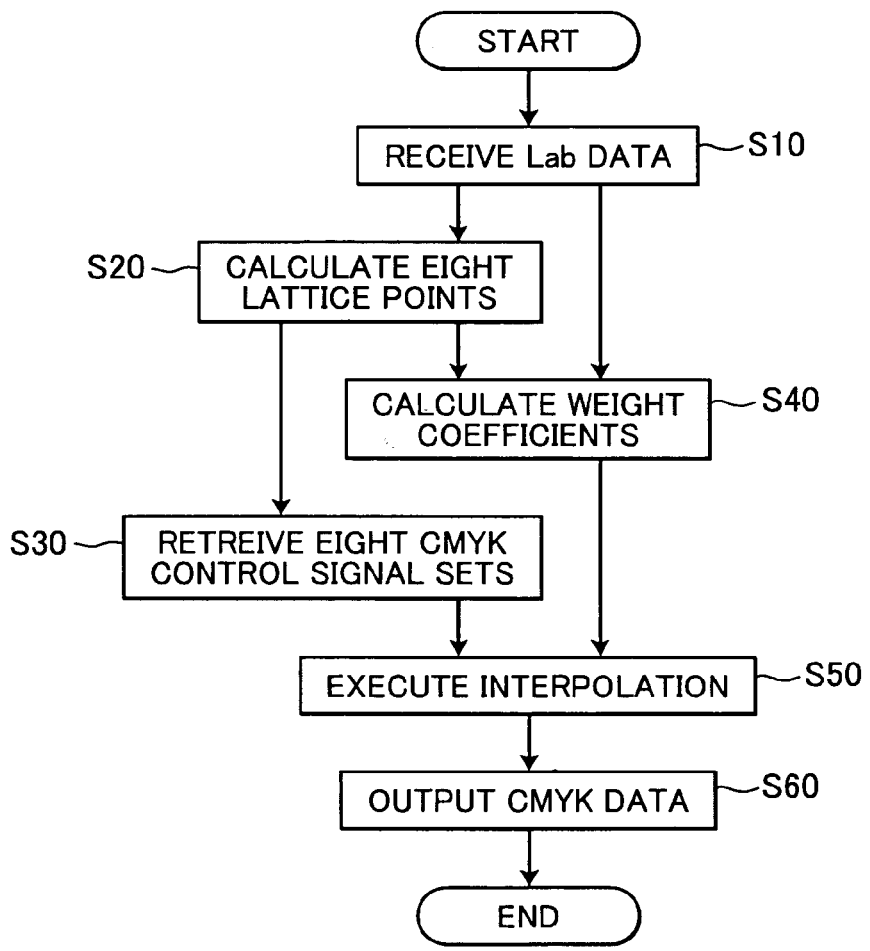
FIG. 4 illustrates a color conversion process executed by the color conversion device of FIG. 2.

As shown in FIG. 4, in Step 10 (hereinafter Step is abbreviated to "S"), the Lab data receiving portion 20 is inputted with one Lab value set ($L_{in}^*$, $a_{in}^*$, $b_{in}^*$). Next, in S20, the LUT address calculating portion 30 selects eight lattice points ($L_n^*$, $a_n^*$, $b_n^*$) that surround a color point indicated by the input Lab value set ($L_{in}^*$, $a_{in}^*$, $b_{in}^*$). Next, in S30, the CMYK data selecting portion 40 retrieves, from the lookup table LUT, eight CMYK control signal sets (C, M, Y, K) that correspond to the eight lattice points ($L_n^*$, $a_n^*$, $b_n^*$). In S40, the weight coefficient calculating portion 50 calculates weight coefficients. The process of S40 may be executed simultaneously with or before the process of S30 as long as after the processes of S10 and S20. In S50, the interpolating portion 60 executes interpolation calculation using the eight CMYK control signal sets (C, M, Y, K) and the weight coefficients, to convert the input Lab data set ($L_{in}^*$, $a_{in}^*$, $b_{in}^*$) into a CMYK control signal set ($C_{out}$, $M_{out}$, $Y_{out}$, $K_{out}$). In S60, the CMYK data outputting portion 70 outputs the CMYK control signal set ($C_{out}$, $M_{out}$, $Y_{out}$, $K_{out}$) to the printer 80. As a result, the printer 60 reproduces a color indicated by the input Lab value set ($L_{in}^*$, $a_{in}^*$, $b_{in}^*$).

The lookup table LUT of FIG. 3 is created by a lookup table creating device 100 beforehand, and is transferred to the color conversion device 1 and stored in the LUT storage portion 10. As shown in FIG. 2, the lookup table creating device 100 is constructed from another personal computer that is different from the personal computer constituting the color conversion device 1. The lookup table creating device 100 creates the lookup table LUT by using the same printer 80 and by using a colorimeter.

The lookup table creating device 100 includes: a CMYK-to-Lab relationship determining portion 110; a CMYK-to-Lab relationship storage portion 120; an Lab lattice-to-CMYK relationship determining portion 130; an Lab lattice-to-CMYK relationship storage portion 140; a CMYK selecting portion 150; a K-value setting portion 160; a CMYK candidate storage portion 170; and a LUT (lookup table) memory 180.

The CMYK-to-Lab relationship determining portion 110 is for determining a CMYK-to-Lab relationship for each of all the $256^4$ number of CMYK color control signals (C, M, Y, K) wherein C, M, Y, K are integers in the range of 0 to 255. As shown in FIG. 5(A), the CMYK-to-Lab relationship is a relationship between each CMYK color control signal set (C, M, Y, K) and a Lab color point (L*, a*, b*) indicative of color obtained by the printer 80 according to the subject CMYK color control signal set (C, M, Y, K). The CMYK-to-Lab relationship storage portion 120 is for storing data of the CMYK-to-Lab relationship determined by the CMYK-to-Lab relationship determining portion 110.

Figure 5C:
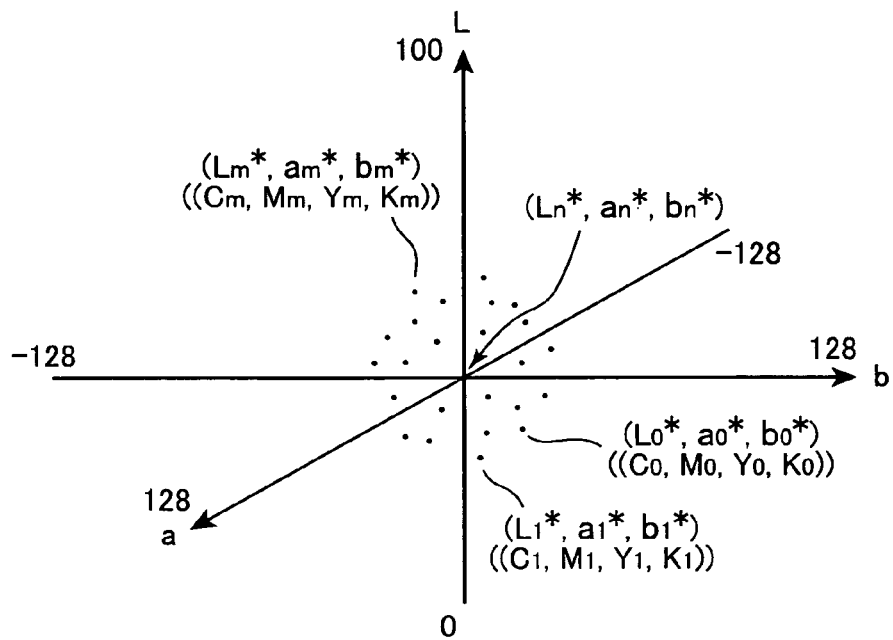
FIG. 5(C) illustrates how a plurality of CMYK control signal sets are related to each Lab lattice point in the Lab lattice-to-CMYK relationship of FIG. 5(B)

The Lab lattice-to-CMYK relationship determining portion 130 is for determining, based on the CMYK-to-Lab relationship, a lattice-to-CMYK relationship. As shown in FIG. 5(B), the lattice-to-CMYK relationship is a relationship between each Lab lattice point ($L_n^*$, $a_n^*$, $b_n^*$) and a plurality of CMYK color control signals (C0, M0, Y0, K0), (C1, M1, Y1, K1), ..., and (Cm, Mm, Ym, Km), whose corresponding color points (L0*, a0* b0*), (L1*, a1*, b1*), ..., and (Lm*, am*, bm*) are sufficiently close to the subject Lab lattice point ($L_n^*$, $a_n^*$, $b_n^*$) as shown in FIG. 5(C). The Lab lattice-to-CMYK relationship storage portion 140 is for storing data of the Lab lattice-to-CMYK relationship determined by the Lab lattice-to-CMYK relationship determining portion 130.

The CMYK selecting portion 150 is for selecting, for each Lab lattice point ($L_n^*$, $a_n^*$, $b_n^*$), one of the plurality of CMYK color control signals (C0, M0, Y0, K0), (C1, M1, Y1, K1), ..., and (Cm, Mm, Ym, Km), thereby creating the lookup table LUT shown in FIG. 3. The CMYK selecting portion 150 performs this selection by using the K-value setting portion 160 and the CMYK candidate storage portion 170. Data of the lookup table LUT is stored in the lookup table memory 180.

Figure 6:
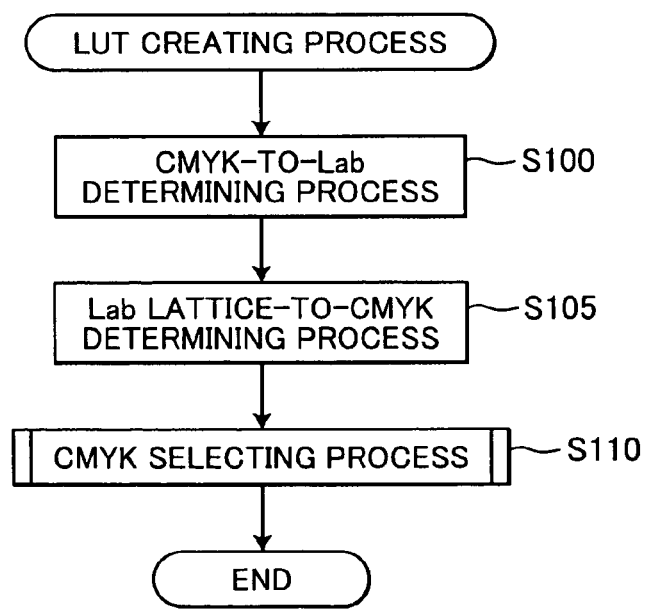
FIG. 6 is a flowchart showing the process of creating the lookup table executed by the lookup table creating device of FIG. 2.

FIG. 6 is a flowchart outlining the process executed by the lookup table creating device 100 to create the lookup table LUT according to the embodiment of the present invention.

First, in S100, the CMYK-to-Lab relationship determining portion 110 determines the CMYK-to-Lab relationship for each of all the $256^4$ number of CMYK control signal sets, wherein C, M, Y, and K are all the integers in the range of 0 to 255, as shown in FIG. 5(A).

Next will be described how the CMYK-to-Lab relationship determining portion 110 determines the CMYK-to-Lab relationship for all the $256^4$ number of CMYK control signal sets.

First, the CMYK-to-Lab relationship determining portion 110 controls the printer 80 by using a number of CMYK color control signal sets (C, M, Y, K) to produce a number of CMYK color patches. It is noted that the values C, M, Y, K in the CMYK color control signal sets (C, M, Y, K) are integers set in the range of 0 to 255 at predetermined intervals greater than 1. The total number of the CMYK color patches is therefore smaller than $256^4$. For example, the values C, M, Y, K in the CMYK color control signal sets (C, M, Y, K) are set to produce well-known IT8 standard color patches defined according to ISO (International Organization for Standardization) or ANSI.

The CMYK-to-Lab relationship determining portion 110 then controls the colorimeter to measure color of each color patch to obtain an Lab colorimetric data set (L*, a*, b*), wherein "L*" is a value in the range of 0 to 100, "a*" is a value in the range of −128 to 128, and "b*" is a value in the range of −128 to 128. As a result, a CMYK-to-Lab relationship between (C, M, Y, K) and (L*, a*, b*) is obtained for each of all the CMYK control signals that have been used for producing the color patches.

Then, in order to obtain a CMYK-to-Lab relationship for each of other CMYK control signals that are not used for producing the color patches, the CMYK-to-Lab relationship determining portion 110 executes an interpolation calculation on the already-obtained CMYK-to-Lab relationship. As a result, the CMYK-to-Lab relationship is obtained for each of all the $256^4$ CMYK control signal sets (C, M, Y, K), wherein C, M, Y, and K are all the integers in the range of 0 to 255, as shown in FIG. 5(A). Data of the CMYK-to-Lab relationships for all the $256^4$ CMYK control signal sets (C, M, Y, K) is stored in the CMYK-to-Lab relationship storage portion 120.

Next, in S105, the Lab lattice-to-CMYK relationship determining portion 130 calculates the Lab lattice-to-CMYK relationship for each Lab lattice point $(L_n^*, a_n^*, b_n^*)$ based on data of the CMYK-to-Lab relationship.

Next will be described how the Lab lattice-to-CMYK relationship determining portion 130 determines the Lab lattice-to-CMYK relationship for one Lab lattice point $(L_n^*, a_n^*, b_n^*)$.

First, the Lab lattice-to-CMYK relationship determining portion 130 searches Lab data for all the CMYK signal sets in the CMYK-to-Lab relationship of FIG. 5(A). The Lab lattice-to-CMYK relationship determining portion 130 then selects a plurality of Lab data sets (L0*, a0*, b0*), (L1*, a1*, b1*), . . . , and (Lm*, am*, bm*), whose color points are distant from the subject Lab lattice point $(L_n^*, a_n^*, b_n^*)$ by a color distance that is smaller than or equal to a predetermined allowable color distance ΔEab (3, in this example) as shown in FIG. 5(C). Then, the Lab lattice-to-CMYK relationship determining portion 130 determines the Lab lattice-to-CMYK relationship for the subject Lab lattice point $(L_n^*, a_n^*, b_n^*)$ by relating the subject Lab lattice point $(L_n^*, a_n^*, b_n^*)$ to CMYK control signal sets (C0, M0, Y0, K0), (C1, M1, Y1, K1), . . . , and (Cm, Mm, Ym, Km) that correspond to the selected Lab data sets (L0*, a0*, b0*), (L1*, a1*, b1*), . . . , and (Lm*, am*, bm*) in the CMYK-to-Lab relationship.

In this way, the Lab lattice-to-CMYK relationship of FIG. 5(B) is obtained for each Lab lattice point $(L_n^*, a_n^*, b_n^*)$ to show that a plurality of CMYK control signal sets (C, M, Y, K) can reproduce colors which are sufficiently similar to the color of the subject lattice point $(L_n^*, a_n^*, b_n^*)$. Data of the Lab lattice-to-CMYK relationship is stored in the Lab lattice-to-CMYK relationship storage portion 140.

Then, in S110, the CMYK selecting portion 150 searches the Lab lattice-to-CMYK relationship, and selects, for each Lab lattice point $(L_n^*, a_n^*, b_n^*)$, one CMYK control signal set (C, M, Y, K) among the plurality of CMYK control signal sets (C, M, Y, K) for the subject Lab lattice point $(L_n^*, a_n^*, b_n^*)$. The CMYK selecting portion 150 sets the CMYK control signal set (C, M, Y, K) for each Lab lattice point $(L_n^*, a_n^*, b_n^*)$ in the lookup table LUT in correspondence with the subject Lab lattice point $(L_n^*, a_n^*, b_n^*)$. As a result, the lookup table LUT is created as shown in FIG. 3. Data of the lookup table LUT is stored in the lookup table memory 180. The data of the lookup table LUT will be loaded into a data recording medium, such as a flexible disk, a CD-ROM, or the like, and is loaded into the lookup table storage portion 10 in the color conversion device 1. Alternatively, the data of the lookup table LUT may be uploaded to a network, such as the Internet, and then downloaded to the color conversion device 1.

Figure 7:
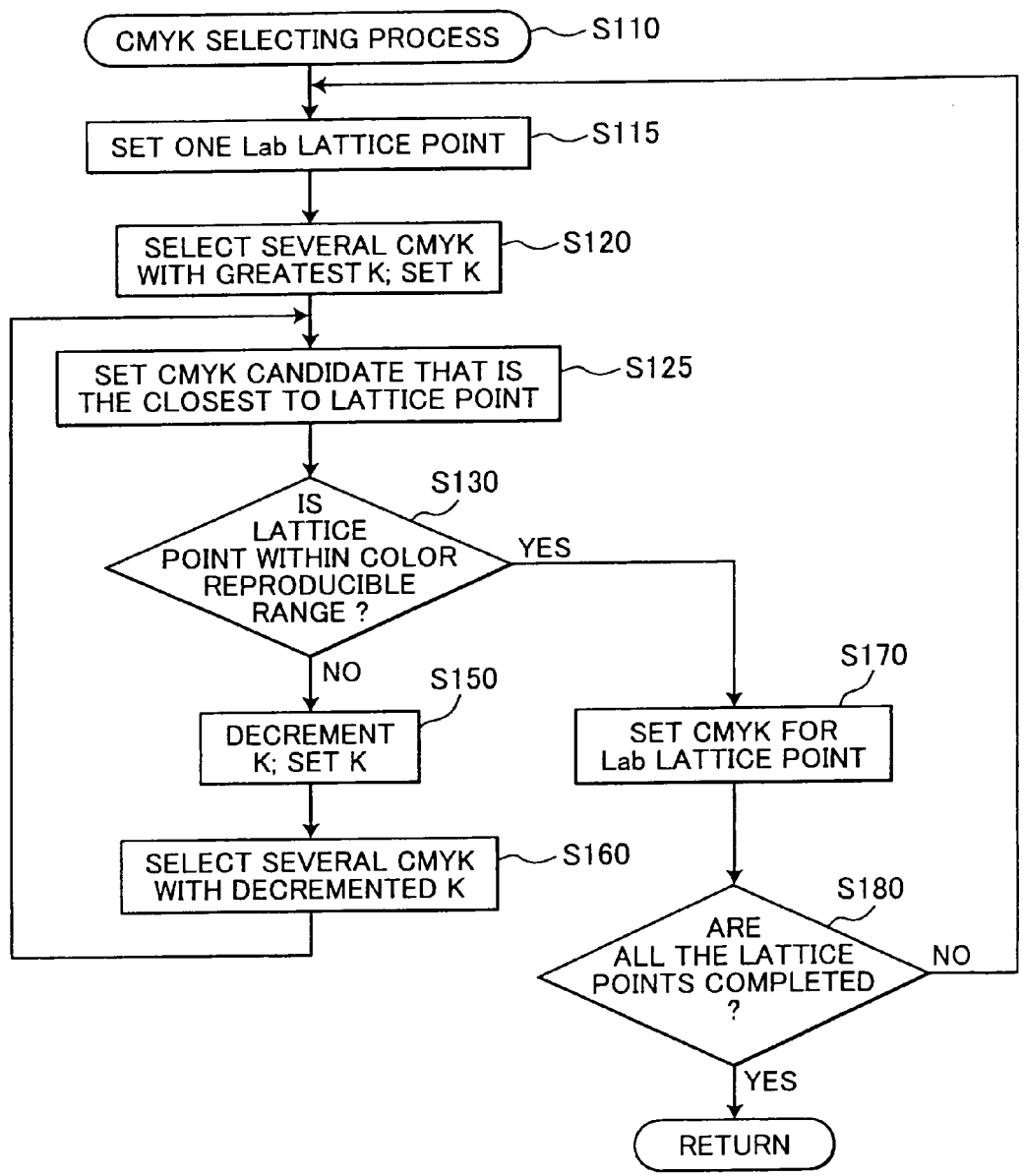
FIG. 7 is a flowchart showing a CMYK selecting process in the lookup table creating process of FIG. 6.

Details of the CMYK selection process of S110 will be described below with reference to FIG. 7.

First, in S115, one Lab lattice point $(L_n^*, a_n^*, b_n^*)$ is set for this process.

Next, in S120, the plurality of CMYK control signal sets (C, M, Y, K) in the Lab lattice-to-CMYK relationship (FIG. 5(B)) for the subject Lab lattice point $(L_n^*, a_n^*, b_n^*)$ are searched to determine several CMYK control signal sets (C, M, Y, K), whose K value is the greatest among the plurality of CMYK control signal sets (C, M, Y, K). Data of the K value is set in the K-value setting portion 160.

Next, in S125, an Lab data set (L*, a*, b*) for each of the several CMYK control signal sets (C, M, Y, K) is retrieved from the CMYK-to-Lab relationship (FIG. 5(A)). A color distance ΔEab, between each Lab data set (L*, a*, b*) and the subject Lab lattice point $(L_n^*, a_n^*, b_n^*)$, is calculated. One CMYK control signal set (C, M, Y, K), whose corresponding Lab data set (L*, a*, b*) is the closest to the subject Lab lattice point $(L_n^*, a_n^*, b_n^*)$, is selected among the several CMYK control signal sets (C, M, Y, K), and is set as a CMYK signal set candidate in the CMYK candidate storage portion 170.

Next, in S130, it is determined whether or not the subject lattice point $(L_n^*, a_n^*, b_n^*)$ falls within a color range reproducible by CMYK control signals sets (C, M, Y, K) whose K value is equal to that presently set in the K-value setting portion 160. Details of the process in S130 will be described later.

If the subject Lab lattice point $(L_n^*, a_n^*, b_n^*)$ does not fall within the color reproducible range of the set K value (No in S130), the program proceeds to S150. In S150, the value of K is decremented by one. The new value of K is set in the K-value setting portion 160.

Next, in S160, several CMYK control signal sets (C, M, Y, K), whose K value has been newly set in S150, are selected among the plurality of CMYK control signal sets (C, M, Y, K) in the Lab lattice-to-CMYK relationship (FIG. 5(B)) for the subject Lab lattice point $(L_n^*, a_n^*, b_n^*)$.

Then, the program returns to S125. In the same manner as described above, one CMYK control signal set (C, M, Y, K), whose corresponding Lab data set (L*, a*, b*) is the closest to the subject Lab lattice point $(L_n^*, a_n^*, b_n^*)$, is selected among the newly-selected several CMYK control signal sets (C, M, Y, K). Then, the program proceeds to S130 in the same manner as described above.

On the other hand, if the subject lattice point ($L_n^*$, $a_n^*$, $b_n^*$) falls within the color reproducible range of CMYK control signal sets (C, M, Y, K) with the presently-set K value (yes in S130), then the program proceeds to S170. In S170, the CMYK control signal set (C, M, Y, K) that has been set as a CMYK control signal candidate in S125 is finally set in the lookup table LUT in correspondence with the subject Lab lattice point ($L_n^*$, $a_n^*$, $b_n^*$), and the program proceeds to S180.

Next, in S180, it is judged whether or not the process of S115–S170 has been executed for all the 101×257×257 Lab lattice points ($L_n^*$, $a_n^*$, $b_n^*$). When the process of S115–S170 has not yet been executed for any Lab lattice points ($L_n^*$, $a_n^*$, $b_n^*$) (no in S180), the process returns to S115, wherein another Lab lattice point ($L_n^*$, $a_n^*$, $b_n^*$) that has not yet been processed is set for the present process. Then, the process from S120 is started again for the new Lab lattice point ($L_n^*$, $a_n^*$, $b_n^*$). Accordingly, the processes of S115–S180 are repeatedly executed for all the Lab lattice points ($L_n^*$, $a_n^*$, $b_n^*$).

On the other hand, when the processes of S115–S180 have been executed for all the lattice points ($L_n^*$, $a_n^*$, $b_n^*$) (yes in S180), the lookup table creating process of FIG. 6 ends. The lookup table LUT is finally completely produced as shown in FIG. 3.

By determining one CMYK control signal (C, M, Y, K) for each Lab lattice point ($L_n^*$, $a_n^*$, $b_n^*$) in this way, it is possible to create the lookup table LUT, in which color represented by each Lab lattice point ($L_n^*$, $a_n^*$, $b_n^*$) is within the color reproducible range of CMYK color control signals whose K value is equal to that of the determined CMYK control signal (C, M, Y, K).

Figure 8:
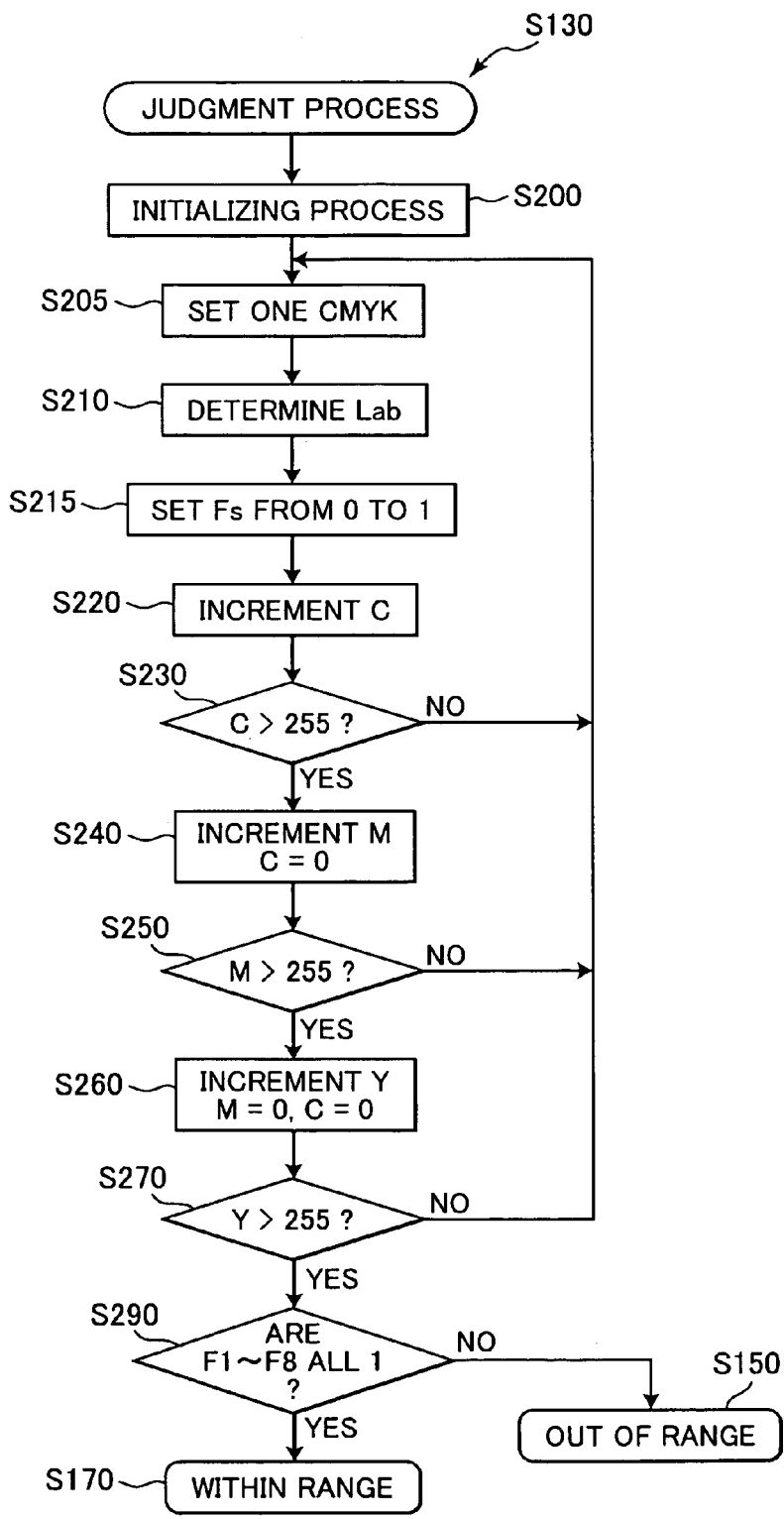
FIG. 8 is a flowchart showing a judging process in the CMYK selecting process of FIG. 7.

Next, the judgment process of S130 for the subject Lab lattice point ($L_n^*$, $a_n^*$, $b_n^*$) will be described with reference to FIG. 8.

First, in S200, the value of K, which is presently being set in the K-value setting portion 160 by the latest-executed process of S120 or S150, is set for this process. C, M, and Y values are initialized to zero (0). In addition, eight flags F1–F8 are initialized to zero (0). The eight flags Fs (s=1–8) correspond to the eight octants Qs that surround the subject Lab lattice point P($L_n^*$, $a_n^*$, $b_n^*$) in the L*a*b* color space.

Then, in S205, one of all the $256^3$ number of CMYK control signal sets (C, M, Y, K) is set, wherein K is fixed to the value set in S200 and C, M, and Y have the presently-set values. A CMYK control signal set (0, 0, 0, K) is now set.

In S210, the CMYK-to-Lab relationship (FIG. 5(A)) for the present CMYK control signal set (C, M, Y, K) is retrieved from the CMYK-to-Lab relationship storage portion 120, thereby setting an Lab value set (L*, a*, b*) for the subject CMYK control signal set (C, M, Y, K).

In S215, it is determined whether a color point of the Lab value set (L*, a*, b*) resides within some of the eight octants Qs (s=1–8) that surround the subject Lab lattice point ($L_n^*$, $a_n^*$, $b_n^*$). If the color point of the Lab value set (L*, a*, b*) resides within one of the eight octants Qs (s=1–8), one flag Fs (s=1–8) corresponding to the octant Qs (s=1–8) that contains the color point therein is set to 1.

Then, in S220, C is incremented by one. The program then proceeds to S230. Because C is now 1 and smaller than 255 (no in S230), the program returns to S205. In S205, a CMYK control signal set (1, 0, 0, K) is now set, wherein K has the value set in S200. Then, the processes of S210–S230 are executed. The processes of S205–S230 are repeatedly executed until C becomes greater than 255 (yes in S230).

When C becomes greater than 255 (yes in S230), M is incremented by one and C is set back to zero in S240. Then, the process proceeds to S250. Because M is now 1 and smaller than 255 (no in S250), the program returns to S205. In S205, a CMYK control signal set (0, 1, 0, K) is now set, wherein K has the value set in S200. Then, the processes of S210–S250 are executed. The processes of S205–S250 are executed repeatedly until M becomes greater than 255 (yes in S250).

When M becomes greater than 255 (yes in S250), Y is incremented by one and C and M are set to zero in S260. Then, the process proceeds to S270. Because Y is now 1 and smaller than 255 (no in S270), the program returns to S205. In S205, a CMYK control signal set (0, 0, 1, K) is now set, wherein K has the value set in S200. Then, the processes of S210–S270 are executed. The processes of S205–S270 are executed repeatedly until Y becomes greater than 255 (yes in S270).

When Y becomes greater than 255 (yes in S270), the program proceeds to S290 In this way, the loop from S205 to S270 is executed repeatedly while incrementing one of the values of C, M, and Y one by one while maintaining the value of K to the value set in S200 until the loop from S205 to S270 has been executed for all the $256^3$ number of CMYK control signal sets (C, M, Y, K) wherein K is fixed to the value set in S200 and C, M, and Y are integers from 0 to 255. Thus, the loop from S205 to S270 are repeated $256^3$ times for all the $256^3$ number of CMYK control signal sets (C, M, Y, K), wherein the value K is fixed to the value set in S200 but each of the values C, M, and Y changes from 0 to 255. When the loop from S205 to S270 has been executed for all the $256^3$ number of CMYK control signal sets (C, M, Y, K), the program proceeds to S290.

In S290, it is determined whether or not all the flags F1–F8 for the subject Lab lattice point ($L_n^*$, $a_n^*$, $b_n^*$) are set to 1. It is noted that Fs of 1 indicates that at least one of the Lab color points (L*, a*, b*) for all the $256^3$ CMYK color control signals exists in the corresponding octant Qs. Fs of 0 indicates that Lab color points (L*, a*, b*) for no CMYK color control signals exist in the corresponding octant Qs. Accordingly, in S290, it is determined whether or not at least one CMYK control signal set exists in each of all the eight octants Qs surrounding the subject Lab lattice point P($L_n^*$, $a_n^*$, $b_n^*$). If all F1–F8 are set to one (1) (yes in S290), it is known that at least one CMYK control signal set exists in each of all the eight octants Qs surrounding the subject Lab lattice point P($L_n^*$, $a_n^*$, $b_n^*$). It is therefore known that the subject Lab lattice point ($L_n^*$, $a_n^*$, $b_n^*$) is located within the color reproducible range of the value K. The judgment of S130 is therefore made affirmative, and the process proceeds to S170 in FIG. 7.

On the other hand, if at least one of the flags F1–F8 is set to zero (0) (no in S290), it is known that no CMYK control signal set exists in at least one of the eight octants Qs surrounding the subject Lab lattice point P($L_n^*$, $a_n^*$, $b_n^*$) It is therefore known that the subject Lab lattice point ($L_n^*$, $a_n^*$, $b_n^*$) is located outside the color reproducible range of the value K. Accordingly, the determination in S130 is negative, and the program proceeds to S150.

The above-described judgment process of S130 will be described with reference to FIG. 9.

Figure 9:
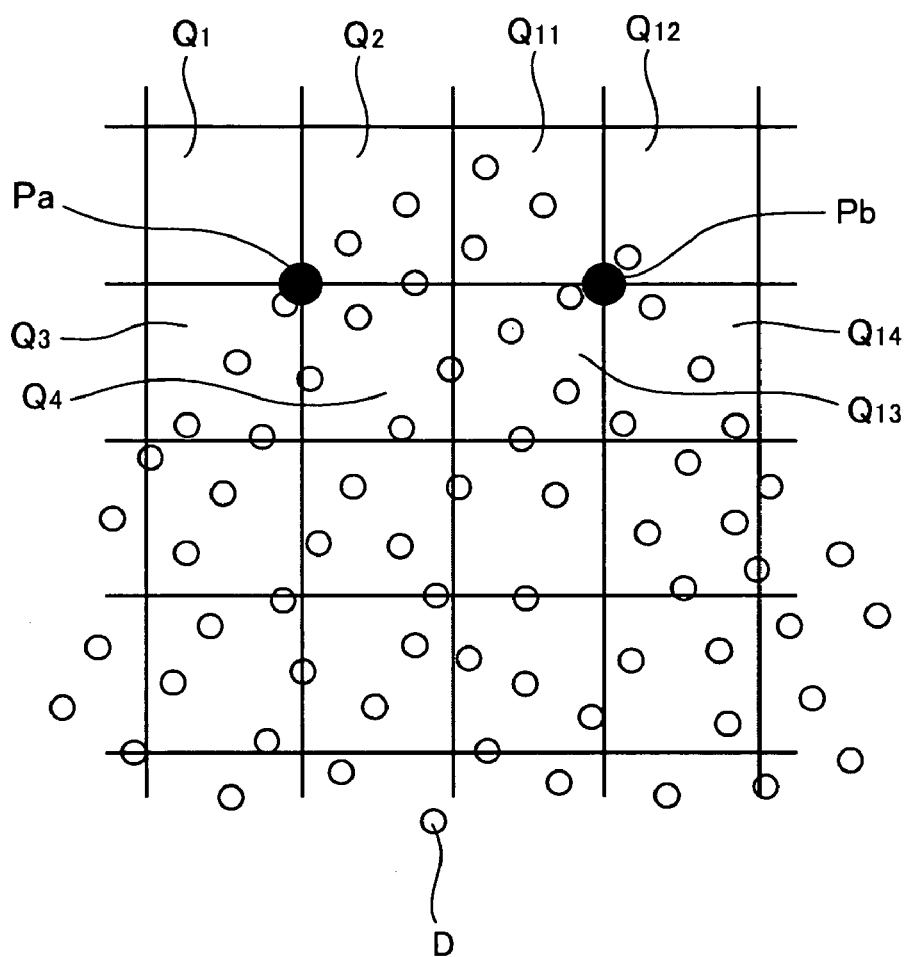
FIG. 9 is an explanatory diagram illustrating how to determine whether an Lab lattice point falls within a color reproducible range during the judging process of FIG. 8.

FIG. 9 illustrates a part of the L*a*b* lattice space. FIG. 9 depicts the L*a*b* lattice space two-dimensionally for illustrative purposes, although actually the L*a*b* lattice space is three-dimensional as shown in FIG. 5(C). In the drawing of FIG. 9, therefore, four quadrants surround each lattice Lab point, instead of the eight octants. Each quadrant is flat, rather than as a three-dimensional space of each octant. After the loop from S205 to S270 in FIG. 8 are repeatedly executed $256^3$ times, L*a*b* value sets (L*, a*, b*) are determined for all the $256^3$ CMYK control signal sets having the single set value K. It is assumed that the L*a*b* value sets (L*, a*, b*) are distributed as indicated by dots D in the L*a*b* lattice space as shown in FIG. 9. If the subject lattice point ($L_n$*, $a_n$*, $b_n$*) is located as indicated by a dot Pb surrounded by four quadrants Q11–Q14, it is known that the lattice point Pb exists within the color reproducible range of K because at least one L*a*b* value set D exists in each of all the quadrants Q11–Q14. On the other hand, if the subject lattice point ($L_n$*, $a_n$*, $b_n$*) is located as indicated by another dot Pa and surrounded by four quadrants Q1–Q4, it is known that at least one L*a*b* value set D exists in each of quadrants Q2–Q4, but no L*a*b* data exists in quadrant Q1. Hence, it is known that the subject lattice point Pa is determined as outside the color reproducible range of K.

By creating the lookup table LUT indicative of the relationship between each Lab lattice point ($L_n$*, $a_n$*, $b_n$*) and a CMYK control signal set (C, M, Y, K) in this way, it is ensured that the Lab lattice point P($L_n$*, $a_n$*, $b_n$*) will always exist within the color reproducible range that can be expressed by the corresponding K color signal. Because the allowable color distance ΔEab is set to 3 in S105 in FIG. 6, the color distance ΔEab between each Lab lattice point ($L_n$*, $a_n$*, $b_n$*) and a corresponding CMYK control signal (C, M, Y, K) in the created lookup table LUT is as small as about 0.4. When actually controlling the printer 80 with each of all the CMYK control signals (C, M, Y, K) in the lookup table LUT to print a color patch and measuring the color patch by using the colorimeter, the measured value had a color distance ΔEab (recovery precision) of as small as about 2.8 from the corresponding Lab lattice point ($L_n$*, $a_n$*, $b_n$*). Thus, the lookup table LUT created according to the embodiment of the present invention has a high L*a*b* recovery precision and can reproduce colors with a highly precise color reproducibility. The lookup table LUT created by the method of the present embodiment also demonstrated good effects in realizing a high gradation of K.

As described above, according to the method for creating the lookup table of the present embodiment, a CMYK-to-Lab relationship is first determined (S100). The CMYK-to-Lab relationship defines a Lab color point for each of all the CMYK data sets as shown in FIG. 5(A). Then, an Lab lattice-to-CMYK relationship is determined (S105). The Lab lattice-to-CMYK relationship defines, for each Lab lattice point, a plurality of allowable CMYK data sets which are indicative of a plurality of Lab color points that are sufficiently close to the subject Lab lattice point as shown in FIGS. 5(B) and 5(C). Then, in S110, one CMYK data set is selected among the plurality of allowable CMYK data sets, and is set in the lookup table LUT in correspondence with the subject Lab lattice point as shown in FIG. 3. During the process of S110, for each Lab lattice point, several allowable CMYK data sets with the largest K value are first selected in S120 among the plurality of CMYK data sets. The value K is set in S120. Then, one CMYK data set with the smallest color distance from the subject Lab lattice point is selected among the several allowable CMYK data sets in S125 Next, in S130, it is judged whether or not the subject Lab lattice point falls within a color reproducible range determined for the value of K of the selected CMYK data set by judging whether or not at least one of $256^3$ number of range-defining CMYK data sets with the set value K resides in each of eight octants Q1–Q8 surrounding the subject Lab lattice point. If the subject Lab lattice point falls within the color reproducible range of the value of K (Yes in S130), then the selected CMYK data set is finally determined for the subject Lab lattice point (S170). On the other hand, if the Lab lattice point does not fall within the color range (No in S130), the value of K is decremented and set (S150). Then, several allowable CMYK data sets with the new K value are selected again among the plurality of allowable CMYK data sets in S160. Then, the program returns to S125, wherein one CMYK data set with the smallest color distance from the subject Lab lattice point is selected again among the newly-selected several allowable CMYK data sets. By determining a CMYK data set for each Lab lattice point in this way, it is possible to create a lookup table indicative of relationship between each Lab lattice point and a CMYK data set, in which each Lab lattice point falls within the color range of the K value in the corresponding CMYK data set.

In S120, several allowable CMYK data sets with the largest K value are selected among the plurality of allowable CMYK data sets. Only when S130 results in a negative judgment, the value K is decremented. Accordingly, it is possible to set, for each Lab lattice point, one CMYK control signal set, whose K value is as high as possible that defines the color reproducible range surrounding the subject Lab lattice point and whose corresponding Lab color point is the closest to the subject Lab lattice point.

It is noted that a color reproducible range changes as the value of the variable K changes. It can therefore be said that one signal component K serves as a variable of a function Fcmy(K) indicative of the color reproducible range that changes as the value of the variable K changes. According to the present embodiment, the number of dimensions of the target CMYK color space is four, and is one larger than the number of dimensions (3) of the input L*a*b* color space. Accordingly, in the above-described embodiment, the number (1) of the variable of the function Fcmy (K) is equal to the difference between the number of dimensions in the target CMYK color space and the number of dimensions in the input L*a*b* color space.

According to the present embodiment, in S120, the component K is selected as the variable for the function Fcmy(K) by selecting the several CMYK control signal sets with the greatest K value among the plurality of allowable CMYK control signal sets. The value of the component K is set also in S120. Thereafter, in S125, the one CMYK control signal set candidate, whose Lab color point is the closest to the Lab lattice point among the several allowable CMYK control signal sets with the fixed value K, is set. Then, it is determined in S130 whether or not the subject Lab lattice point falls within the color reproducible range. During the judging process of S130, the process of S205–S270 are executed repeatedly. Repeating the processes of S205 to S270 are equivalent to determining the color reproducible range by substituting the value set in S120 for the variable K in the function Fcmy(K). If the lattice point falls within the color reproducible range (yes in S130), it is known that the set value K is allowable. Accordingly, the CMYK candidate is finally set in the lookup table LUT in correspondence with the Lab lattice point in S170. On the other hand, if the lattice point does not fall within the color reproducible range for the set value K (no in S130), the variable K is changed in S150. The determination is conducted again in S130 by changing the color reproducible range Fcmy(K) according to the newly-set value K.

It is noted that the number of the variable for the color reproducible range function is not limited to be equal to the difference between the number of dimensions in the target CMYK color space and the number of dimensions in the input L*a*b* color space, but may be greater than the difference.

For example, signal components K and Y may be selected as two variables defining a function Fcm(K, Y) that is indicative of a color reproducible range that changes as the values of the variables K and Y change. In S120, the components K and Y are set as the variables of the function Fcm(K, Y) by selecting several CMYK sets with the greatest values K and Y among the plurality of allowable CMYK sets. Then, the values of the components K and Y are set also in S120. Then, in S125, one CMYK set candidate, whose Lab color point is the closest to the Lab lattice point among the several allowable CMYK control signal sets with the set values K and Y. It is determined in S130 whether or not the subject lattice point falls within the color reproducible range for the set values K and Y. During the process of S130, the values K and Y are set in S200 to the values set in S120. The processes of S260 and S270 are omitted from the process of S130, and the processes of S205 to S250 are repeatedly executed $256^2$ times to determine the color reproducible range. Execution of the processes of S205 to S250 are equivalent to substituting the set values K and Y in the function Fcm(K, Y). If the lattice point falls within the color reproducible range (yes in 3130), it is known that the set values K and Y are allowable. Accordingly, the CMYK set candidate is finally set in the lookup table LUT in correspondence with the Lab lattice point in S170. On the other hand, if the lattice point does not fall within the color reproducible range for the set values K and Y (no in S130), the variables K and Y are changed in S150, and the determination is conducted again in S130 by changing the color reproducible range Fcm(K, Y) according to the newly-set values K and Y.

In the above-described embodiment, the process of S125 is executed after the process of S120 or S150 is executed and before the process of S130 is executed. That is, after the K value is set in S120 or S150 and before it is judged in S130 whether the subject Lab lattice point is within the color reproducible range for the set value K, the process of S125 is executed to select one CMYK candidate, whose corresponding Lab color point is the closest to the subject Lab lattice point among the several allowable CMYK control signal sets with the set value K. However, the process of S125 may be executed after the affirmative judgment in S130. That is, after the K value is set in S120 or S150 and after it is determined in S130 that the subject Lab lattice point is within the color reproducible range for the set value K, the process of S125 may be executed to select one CMYK, whose corresponding Lab color point is the closest to the subject Lab lattice point among the several allowable CMYK control signal sets with the set value K. Thereafter, the thus selected one CMYK is finally set in S170.

In the above-described embodiment, the lookup table is for converting the L*a*b* space into the CMYK space. However, the present invention is not limited to converting the L*a*b* space into the CMYK space. The present invention can be applied to converting various types of input color space into various types of target color space. For example, the present invention can be applied to converting an input color space, such as XYZ and Luv, other than the L*a*b* space into the CMYK space, and can be applied to converting the L*a*b* space into a target color space, such as RGB, other than CMYK space.

It is possible to create a lookup table by using the same method described above when the number of dimensions of the target color space is one greater than that of the input color space.

In more concrete terms, one color component X (=K, in the above-described embodiment) is selected among several color components defined in the target color space. A color reproducible range is defined as a function F(X) that changes as the value of the selected color component X changes. After setting the value of the variable X, it is determined whether a lattice point in the input color space falls within the color reproducible range F(X) that is determined by substituting the set value X in the function F(X). If the lattice point falls within the color reproducible range, it is known that the set value X is allowable. Accordingly, among the several allowable color-component signal sets with the set value X, one color-component signal set whose corresponding color point is the closest to the lattice point is finally set in the lookup table in correspondence with the lattice point. On the other hand, if the lattice point does not fall within the color reproducible range, the value of the variable X is changed, and the determination is conducted again by changing the color reproducible range F(X) according to the newly-set value for the variable X.

The present invention can also be applied in the following way when the number of dimensions of the target color space is two or more greater than that of the input color space. Here, a description will be given for the case of the number of dimensions of the target color space being two greater than that of the input color space.

In this case, two color components X and Y are selected among several color components defined in the target color space. For example, when the target color space is CMYK as in the embodiment described above, two components K and Y may be selected. A color reproducible range is defined as a function F(X, Y) that changes as the values of the selected color components X and Y change. After setting the values of the variables X and Y, it is determined whether a lattice point in the input color space falls within the color reproducible range F(X, Y) that is determined by substituting the set values X and Y in the function F(X). If the lattice point falls within the color reproducible range, it is known that the set values X and Y are allowable. Accordingly, among the several allowable color-component signal sets with the set values X and Y, one color-component signal set whose corresponding color point is the closest to the lattice point is finally set in the lookup table in correspondence with the lattice point. On the other hand, if the lattice point does not fall within the color reproducible range, the values of the variables X and Y are changed, and the determination is conducted again by changing the color reproducible range F(X, Y) according to the newly-set value for the variables X and Y.

While the invention has been described in detail with reference to the specific embodiment thereof, it would be apparent to those skilled in the art that various changes and modifications may be made therein without departing from the spirit of the invention.

For example, in the above-described embodiment, in S105, the Lab lattice-to-CMYK relationship is determined to indicate a plurality of allowable CMYK control signal sets whose corresponding Lab color points are sufficiently close to the subject Lab lattice point. Then, in S120 or S160, several CMYK control signal sets with a fixed K value are selected among the plurality of allowable CMYK control signal sets. In S125, one CMYK control signal set closest to the subject Lab lattice point is selected as a candidate among the several CMYK control signal sets. If the $256^3$ number of range-defining CMYK control signal sets with the same K value, which define the color reproducible range, sufficiently surround the subject Lab lattice point, the candidate CMYK is finally set for the subject Lab lattice point in S170. The thus finally-set CMYK control signal set is equivalent to one of the $256^3$ number of range-defining CMYK control signal sets that is the closest to the subject Lab lattice point. In other words, the finally-set CMYK control signal set indicates a color point that is the closest to the subject Lab lattice point within the color reproducible range surrounding the subject Lab lattice point.

The lookup table creating method of the present invention can therefore be modified from that of the above-described embodiment in various manners as long as the method can set, for each Lab lattice point, a CMYK control signal set that is the closest to the subject Lab lattice point among all the range-defining CMYK control signal sets that sufficiently surround the subject Lab lattice point.

For example, the process of S125 may be omitted. The process of S170 is modified in a manner that if the $256^3$ CMYK control signal sets created in S200–S270 with the K value set in S120 or S160 sufficiently surround the subject Lab lattice point (yes in S130), the process of S170 is executed to set one CMYK control signal set that is the closest to the subject Lab lattice point among the $256^3$ CMYK control signal sets created in S200–S270. As a result, the CMYK control signal set that is the closest to the subject Lab lattice point within the color reproducible range is finally set in S170.

The process of S105, S125, and S160 may be omitted. In this case, in S120, no CMYK control signal sets are selected, but the K value of 255 is automatically set. In S130, all the $256^3$ CMYK control signal sets for K of 255 are created and it is judged whether at least one CMYK control signal set with the set K value (now, 255) resides in each of the eight octants Q1–Q8 surrounding the Lab lattice point, thereby judging whether the $256^3$ CMYK control signal sets sufficiently surround the subject Lab lattice point. If the $256^3$ CMYK control signal sets fail to sufficiently surround the subject Lab lattice point (no in S130), the K value is decremented in S150. The program directly returns to S130. On the other hand, if the $256^3$ CMYK control signal sets sufficiently surround the subject Lab lattice point (yes in S130), one of the $256^3$ CMYK control signal sets that is the closest to the subject Lab lattice point is set in S170. In this case, it is ensured that at least one CMYK control signal set with the presently-set K value resides in each of all the eight octants Q1–Q8 surrounding the Lab lattice point. It is therefore ensured that the one CMYK control signal set closest to the subject Lab lattice point is distant from the subject Lab lattice point by a distance smaller than a value of $\Delta Eab=(\Delta L^{*2}+\Delta a^{*2}+\Delta b^{*2})^{1/2}=(1^2+1^2+1^2)^{1/2}=3^{1/2}$. It is therefore ensured that the one CMYK control signal set finally set in S170 is fully close to the subject lattice point. Therefore, also according to this modification, it is possible to set, for each Lab lattice point, one CMYK control signal set, whose K value is the greatest among several K values that can define color reproducible ranges that surround the subject Lab lattice point and whose corresponding Lab color point is sufficiently close to the subject Lab lattice point.

In the above-described embodiment, the plurality of lattice points $(L_n^*, a_n^*, b_n^*)$ are defined so that "$L_n^*$" are all the integers between 0 and 100, "$a_n^*$" are all the integers between −128 and 128, and "$b_n^*$" are all the integers between −128 and 128. In other words, the values "$L_n^*$", "$a_n^*$", "$b_n^*$" are arranged at an interval I of one (1) on the corresponding L*-, a*-, and b*- axes. However, the plurality of lattice points $(L_n^*, a_n^*, b_n^*)$ may be defined so that their values "$L_n^*$", "$a_n^*$", "$b_n^*$" are arranged at intervals I greater than one (1). Eight octants Qs (s=1–8) are defined by the subject lattice point $(L_n^*, a_n^*, b_n^*)$ and its neighboring 26 lattice points $(L_n^*-I, a_n^*-I, b_n^* -I)$, $(L_n^*-I, a_n^*-I, b_n^*)$, $(L_n^*-I, a_n^*-I, b_n^*+I)$, $(L_n^*-I, a_n^*, b_n^*-I)$, $(L_n^*-I, a_n^*, b_n^*)$, $(L_n^*-I, a_n^*, b_n^*+I)$, $(L_n^*-I, a_n^*+I, b_n^*-I)$, $(L_n^*-I, a_n^*+I, b_n^*)$, $(L_n^*-I, a_n^*+I, b_n^*+I)$, $(L_n^*, a_n^*-I, b_n^*-I)$, $(L_n^*, a_n^*-I, b_n^*)$, $(L_n^*, a_n^*-I, b_n^*+I)$, $(L_n^*, a_n^*, b_n^*-I)$, $(L_n^*, a_n^*, b_n^*+I)$, $(L_n^*, a_n^*+I, b_n^*-I)$, $(L_n^*, a_n^*+I, b_n^*)$, $(L_n^*, a_n^*+I, b_n^*+I)$, $(L_n^*+I, a_n^*-I, b_n^*-I)$, $(L_n^*+I, a_n^*-I, b_n^*)$, $(L_n^*+I, a_n^*-I, b_n^*+I)$, $(L_n^*+I, a_n^*, b_n^*-I)$, $(L_n^*+I, a_n^*, b_n^*)$, $(L_n^*+I, a_n^*, b_n^*+I)$, $(L_n^*+I, a_n^*+I, b_n^*-I)$, $(L_n^*+I, a_n^*+I, b_n^*)$, $(L_n^*+I, a_n^*+I, b_n^*+I)$. It is noted that the invervals I on the respective L*-, a*-, and b*- axes may be equal to or different from one another.

For example, the plurality of lattice points $(L_n^*, a_n^*, b_n^*)$ may be defined so that their values "$L_n^*$", "$a_n^*$", "$b_n^*$" are arranged at intervals I of ten (10). In such a case, eight octants Qs (s=1–8) are defined by the subject lattice point $(L_n^*, a_n^*, b_n^*)$ and its neighboring 26 lattice points $(L_n^*-10, a_n^*-10, b_n^*-10)$, $(L_n^*-10, a_n^*-10, b_n^*)$, $(L_n^*-10, a_n^*-10, b_n^*+10)$, $(L_n^*-10, a_n^*, b_n^*-10)$, $(L_n^*-10, a_n^*, b_n^*)$, $(L_n^*-10, a_n^*, b_n^*+10)$, $(L_n^*-10, a_n^*+10, b_n^*-10)$, $(L_n^*-10, a_n^*+10, b_n^*)$, $(L_n^*-10, a_n^*+10, b_n^*+10)$, $(L_n^*, a_n^*-10, b_n^*-10)$, $(L_n^*, a_n^*-10, b_n^*)$, $(L_n^*, a_n^*-10, b_n^*+10)$, $(L_n^*, a_n^*, b_n^*-10)$, $(L_n^*, a_n^*, b_n^*+10)$, $(L_n^*, a_n^*+10, b_n^*-10)$, $(L_n^*, a_n^*+10, b_n^*)$, $(L_n^*, a_n^*+10, b_n^*+10)$, $(L_n^*+10, a_n^*-10, b_n^*-10)$, $(L_n^*+10, a_n^*-10, b_n^*)$, $(L_n^*+10, a_n^*-10, b_n^*+10)$, $(L_n^*+10, a_n^*, b_n^*-10)$, $(L_n^*+10, a_n^*, b_n^*)$, $(L_n^*+10, a_n^*, b_n^*+10)$, $(L_n^*+10, a_n^*+10, b_n^*-10)$, $(L_n^*+10, a_n^* +10, b_n^*)$, $(L_n^*+10, a_n^*+10, b_n^*+10)$.

If the above-described modification, in which the processes of S105, S125, and S160 are omitted, is applied to the case where the lattice points $(L_n^*, a_n^*, b_n^*)$ have their values "$L_n^*$", "$a_n^*$", "$b_n^*$" arranged at intervals I of as great as ten (10), for example, there is a possibility that one CMYK control signal set that is determined closest to the subject Lab lattice point will be distant from the subject Lab lattice point by a distance smaller than but almost equal to $\Delta Eab=(\Delta L^{*2}+\Delta a^{*2}+\Delta b^{*2})^{1/2}=(10^2+10^2+10^2)^{1/2}=300^{1/2}$. In such a case, it will be impossible to reproduce the color of the subject lattice point with high accuracy. Considering this potential problem, an additional judgment process may be provided between S130 and S170. More specifically, when S130 results in an affirmative judgment, it is further judged whether or not a CMYK control signal that has the presently-set K value and that is the closest to the subject Lab lattice point is away from the subject Lab lattice point by a distance greater than the allowable color distance ΔEab. In this case, the value of the allowable color distance ΔEab may preferably be set to as small as 0.3, for example. If the closest CMYK control signal set is away from the subject Lab lattice point by a distance greater than the allowable color distance ΔEab, the process does not proceed to S170, but proceeds to S150 to decrement the value K. Only when the closest CMYK control signal set is close to the subject Lab lattice point by a distance smaller than or equal to the allowable color distance ΔEab, the process proceeds to S170.

The processes of S220–S270 need not be performed for all the $256^3$ combinations of CMY values in the range of 0 to 255. That is, during the processes of S220–S270, the values C, M, and Y are incremented at an interval of one (1) to determine Lab value sets for all the $256^3$ sets of CMYK data with the fixed K value. However, the values C, M, and Y may be incremented at another interval greater than one (1) between 0 and 255 to determine Lab value sets for a smaller number of sets of CMYK data. For example, the values C, M, and Y may be incremented at an interval of five from 0 to 255. It is possible to execute the judgment process of S130 more quickly.

Additionally, the processes of S220–S270 may be executed for CMYK combinations only near the subject Lab lattice point P. For example, the processes of S220–S270 may be executed for only those CMYK combinations, whose corresponding Lab color points exist in a rectangular space of a small volume of 2L×2a×2b which is defined by the eight octants Q1–Q8 surrounding the subject Lab lattice point ($L_n^*$, $a_n^*$, $b_n^*$). It is noted that 2L×2a×2b=8I$^3$ if I is an interval between the adjacent Lab lattice points on the L*–, a*–, and b*– axes. Or, the processes of S220–S270 may be performed for those CMYK combinations, whose corresponding Lab color points exist in a rectangular space of a larger volume of 4L×4a×4b that surround the subject Lab lattice point ($L_n^*$, $a_n^*$, $b_n^*$). It is noted that 4L×4a ×4b=64I$^3$ if I is an interval between the adjacent Lab lattice points on the L*–, a*–, and b*– axes. It is possible to execute the judgment process of S130 more quickly.

In the above-described embodiment, the color conversion device 1 is constructed from a personal computer. However, the color conversion device of the present invention may be constructed from a printer. In this case, the configuration of the color conversion device 1 shown in FIG. 2 is incorporated in the printer 80. The printer 80 executes the color conversion operation shown in FIG. 4 to receive from outside an Lab input data set ($L_{in}^*$, $a_{in}^*$, $b_{in}^*$), to convert the data into a CMYK control signal set ($C_{out}$, $M_{out}$, $Y_{out}$, $K_{out}$), and to print the CMYK control signal set ($C_{out}$, $M_{out}$, $Y_{out}$, $K_{out}$).

In the above-described embodiment, the lookup table creating device 100 is constructed from the computer that is different from the computer constituting the color conversion device 1. However, the lookup table creating device 100 may be constructed from the computer that constitutes the color conversion device 1. In this case, the color conversion device (lookup table creating device 100) 1 has both of the configuration of the color conversion device 1 and the lookup table creating device 100 shown in FIG. 2.

In the above-described embodiment, the allowable color distance ΔEab is set to 3. However, the allowable color distance ΔEab is not limited to 3, but may be set to other values such as 1 or 2.

What is claimed is:

1. A method of creating a lookup table indicating a relationship between each lattice point in an input color space and a color signal set in a target color space, the input color space being defined by several color components whose total number has a first value, the target color space being defined by several color-signal components, whose total number has a second value greater than the first value by a difference number and each of which has one of a plurality of discrete values, the input color space being divided into a lattice to define a plurality of lattice points indicative of a plurality of lattice color sets, each lattice color set being constructed from color values of the several color components, a color value of each color component in the lattice color set having one of another plurality of discrete values, the color signal set being constructed from color values of the several color-signal components, the method comprising the steps of:

determining one color signal set for each lattice point in the input color space, a color reproducible range being defined in the input color space and being determined dependently on a value of at least one color-signal component in the determined color signal set, the total number of the at least one color-signal component being greater than or equal to the difference number, the color reproducible range containing the subject lattice point and a color point of the determined color signal set therein, the subject lattice point being the closest to the color point of the determined color signal set within the color reproducible range; and setting, for each lattice point, the one color signal set determined for the subject lattice point, thereby creating the lookup table.

2. A method as claimed in claim 1, wherein the determining step includes:

a variable-setting step of setting the at least one color-signal component as at least one variable for a color reproducible range function, the color reproducible range function indicating the color reproducible range that varies as the value of the at least one variable changes, the total number of the at least one variable being greater than or equal to the difference number; and a color signal-set determining step determining the one color signal set for each lattice point, the color reproducible range being determined by substituting the value of the at least one color-signal component in the determined color signal set for the at least one variable in the color reproducible range function.

3. A method as claimed in claim 2, wherein the color-signal set determining step includes:

a component-value setting step setting the value of the at least one color-signal component;

a range-determining step determining the color reproducible range for the set value by substituting the set value for the at least one variable in the color reproducible range function;

a judging step judging whether the color reproducible range contains the subject lattice point; and a judged-result dependent determining step of determining for the subject lattice point, when the color reproducible range contains the subject lattice point therein, one color signal set whose color point is defined within the color reproducible range and is the closest from the subject lattice point within the color reproducible range, further comprising a step of repeating the color-signal set determining step when the color reproducible range does not contain the subject lattice point, the repeating step executing the component-value setting step to set the value of the at least one color-signal component value into a value different from that in a latest-executed color-signal set determining process.

4. A method as claimed in claim 3, wherein the color reproducible range function is defined by a plurality of color points for a plurality of range-determining color signal sets that have the same value for the at least one color-signal component, wherein the range-determining step determines a plurality of range-determining color signal sets that have the value set by the component-value setting step for the at least one color-signal component, thereby substituting the set value for the at least one variable in the color reproducible range function and determining the color reproducible range for the set value, wherein the judging step judges whether a plurality of color points for the plurality of range-determining color signal sets surround the subject lattice point, thereby judging whether the color reproducible range contains the subject lattice point, and wherein the judged-result dependent determining step determines, when the plurality of color points for the plurality of range-determining color signal sets surround the subject lattice point, one range-determining color signal set whose corresponding color point is the closest from the subject lattice point among the plurality of range-determining color signal sets.

5. A method as claimed in claim 4, wherein the judging step judges whether the plurality of color points for the plurality of range-determining color signal sets surround the subject lattice point by judging whether at least one range-determining color signal set resides in each of a plurality of spaces that are defined between the subject lattice point and its neighboring lattice points.

6. A method as claimed in claim 4, wherein the color-signal set determining step further includes an allowable set setting step setting, for each lattice point, a plurality of allowable color signal sets indicative of a plurality of color points that are distant from the subject lattice point by color distances smaller than or equal to a predetermined allowable distance in the input color space, the plurality of allowable color signal sets including several range-defining allowable color signal sets each of which has the set value for the at least one color-signal component,
wherein the judged-result dependent determining step selects, when the plurality of color points for the plurality of range-determining color signal sets surround the subject lattice point, one range-determining allowable color signal set whose corresponding color point is the closest to the subject lattice point among the several range-defining allowable color signal sets.

7. A method as claimed in claim 6, wherein the color-signal set determining step further includes:
a step of selecting, among the plurality of allowable color signal sets, the several range-defining allowable color signal sets, each of which has the set value for the at least one color-signal component; and
a step of selecting, as a candidate, one range-defining allowable color signal set whose corresponding color point is the closest to the subject lattice point among the several range-defining allowable color signal sets,
wherein the judged-result dependent determining step includes a step of setting the candidate for the subject lattice point when the plurality of color points for the plurality of range-determining color signal sets surround the subject lattice point.

8. A method as claimed in claim 1, further comprising the steps of:
receiving an input color value set indicative of a desired color point in the input color space;
searching the lookup table to determine several lattice points that surround the desired color point;
retrieving, from the lookup table, several color signal sets corresponding to the determined several lattice points; and
calculating a color signal set based on the retrieved several color signal sets.

9. A method as claimed in claim 1, wherein the input color space is a predetermined L*a*b* color space defined by L*, a*, and b* color components.

10. A method as claimed in claim 1, wherein the target color space is a predetermined CMYK color space defined by C, M, Y, and K color-signal components, and wherein the color reproducible range is determined dependently on the value of the K color-signal component.

11. A method of creating a lookup table indicating a relationship between each lattice point in an input color space and a color signal set in a target color space, the input color space being defined by several color components whose total number has a first value, the target color space being defined by several color-signal components, whose total number has a second value greater than the first value by a difference number and each of which has one of a plurality of discrete values, the input color space being divided into a lattice to define a plurality of lattice points indicative of a plurality of lattice color sets, each lattice color set being constructed from color values of the several color components, a color value of each color component in the lattice color set having one of another plurality of discrete values, the color signal set being constructed from color values of the several color-signal components, the method comprising the steps of:
setting, for each lattice point in the input color space, a plurality of allowable color signal sets indicative of a plurality of color points in the input color space that are distant from the subject lattice point by color distances smaller than or equal to a predetermined allowable distance in the input color space, at least one variable, which is constituted by at least one of the several color-signal components and whose total number is greater than or equal to the difference number, defining a color reproducible range function indicative of a color reproducible range that is defined in the input color space and that varies as the value of the variable changes;
determining, for each lattice point in the input color space, one color signal set among the plurality of allowable color signal sets, a color reproducible range determined by substituting, for the at least one variable in the color reproducible range function, the value of the at least one color-signal component in the determined color signal set, containing the subject lattice point therein, a color difference between the subject lattice point and a color point of the determined color signal set being the smallest among several ones of the plurality of allowable color signal sets that have the same value for the at least one color-aignal component; and
setting, for each lattice point, the one color signal set determined for the subject lattice point, thereby creating the lookup table.

12. A method as claimed in claim 11, wherein the color reproducible range is defined by a plurality of range-defining color signal sets, each of which has the at least one color-signal component of a value equal to that of the at least one color-signal component of the determined color signal set, the plurality of range-defining color signal sets indicating a plurality of color points that surround the subject lattice point in the input color space.

13. A method as claimed in claim 11, wherein the determining step includes the steps of:
selecting, among the plurality of allowable color signal sets, several allowable color signal sets, each of which has the same value in the at least one color-signal component;
setting the value of the at least one color-signal component in the selected several allowable color signal set;
selecting, among the several allowable color signal sets, one color signal set indicative of one color point with its color difference from the subject lattice point being the smallest among the several allowable color signal sets;
determining the color reproducible range that is defined by the set value for the at least one color-signal component;
judging whether the subject lattice point is located within the color reproducible range; and setting, when the subject lattice point is located within the color reproducible range, the selected one color signal set in correspondence with the subject lattice point, further comprising the step of repeating the determining step when the subject lattice point is outside the color reproducible range, the repeating step executing the several allowable color signal set-selecting process to select, among the plurality of allowable color signal sets, other several allowable color signal sets, whose at least one color-signal component is equal to another value that is different from the value set in the latest determining routine.

14. A method as claimed in claim 13, wherein the color reproducible range determining step includes the step of determining a plurality of color points for a plurality of range-defining color signal sets whose at least one color-signal component has a value equal to the set value, wherein the judging step judges whether the plurality of range-defining color points are located to surround the subject lattice point in the input color space.

15. A method of creating a lookup table indicating a relationship between each of a plurality of Lab lattice points (L*, a*, b*) defined in a predetermined L*a*b* color space and a CMYK color control signal set (C, M, Y, K), the L*a*b* color space being a three-dimensional color space defined by an L axis, an a axis, and a b axis that extend substantially perpendicularly with one another, the L*a*b* color space being divided into a lattice to define a plurality of Lab lattice points, each of the values C, M, Y, and K in the CMYK color control signal set (C, M, Y, K) having one of a plurality of discrete values, the method comprising the steps of:

setting, for each Lab lattice point (L*, a*, b*), a plurality of allowable CMYK color control signal sets (C, M, Y, K) indicative of a plurality of Lab color points that are distant from the subject Lab lattice point (L*, a*, b*) by color distances smaller than or equal to a predetermined allowable distance in the L*a*b* color space;

determining, for each Lab lattice point (L*, a*, b*), one CMYK color control signal set (C, M, Y, K) among the plurality of allowable CMYK color control signal sets (C, M, Y, K), the K value of the determined CMYK color control signal set (C, M, Y, K) defining, in the L*a*b* color space, a color reproducible range that contains the subject lattice point (L*, a*, b*) therein, a color difference between the subject lattice point (L*, a*, b*) and an Lab color point for the determined CMYK color control signal set (C, M, Y, K) being the smallest among several allowable CMYK color control signal sets (C, M, Y, K) that have the same value K with the determined CMYK color control signal set (C, M, Y, K) among the plurality of allowable CMYK color control signal sets (C, M, Y, K); and setting, for each Lab lattice point (L*, a*, b*), the one CMYK color control signal set (C, M, Y, K) determined for the subject one Lab lattice point (L*, a*, b*), thereby creating the lookup table.

16. A method as claimed in claim 15, wherein the color reproducible range is defined by a plurality of K-fixed CMYK color control signal sets (C, M, Y, K) whose K value is equal to the value K of the determined CMYK color control signal set (C, M, Y, K), the plurality of K-fixed CMYK color control signal sets (C, M, Y, K) indicating a plurality of Lab color points that surround the subject lattice point (L*, a*, b*) in the L*a*b* color space.

17. A method as claimed in claim 16, wherein the plurality of Lab color points, surrounding the subject lattice point (L*, a*, b*), include at least eight Lab color points that are located in eight spaces, respectively, the eight spaces being defined between the subject lattice point and its neighboring lattice points and surrounding the subject Lab lattice point in the L*a*b* color space.

18. A method as claimed in claim 15, wherein the determining step includes the steps of:

selecting, among the plurality of allowable CMYK color control signal sets (C, M, Y, K), several K-fixed CMYK color control signal sets (C, M, Y, K), each of which has a value of K equal to a fixed value;

setting the value of K;

selecting, among the several K-fixed CMYK color control signal sets (C, M, Y, K), one CMYK color control signal set (C, M, Y, K) indicative of one Lab color point with its color difference from the subject lattice point (L*, a*, b*) being the smallest among the several K-fixed CMYK color control signal sets (C, M, Y, K);

determining the color reproducible range that is defined by the value K of the selected one CMYK color control signal set (C, M, Y, K) in the Lab lattice color space;

judging whether the subject Lab lattice point (L*, a*, b*) is located within the color reproducible range; and setting, when the subject Lab lattice point (L*, a*, b*) is located within the color reproducible range, the selected one CMYK color control signal set (C, M, Y, K) in correspondence with the subject Lab lattice point (L*, a*, b*), further comprising the step of repeating the determining step when the subject Lab lattice point (L*, a*, b*) is outside the color reproducible range, the repeating step executing the several K-fixed allowable CMYK color control signal set-selecting process to select, among the plurality of allowable CMYK color control signal sets (C, M, Y, K), other several K-fixed allowable CMYK color control signal sets (C, M, Y, K), whose K value is equal to another fixed value that is different from the fixed value set by the K value setting process in the latest determining routine.

19. A method as claimed in claim 18, wherein the several K-fixed allowable CMYK color control signal set-selecting step initially selects several K-fixed allowable CMYK color control signal sets (C, M, Y, K), whose K value is the greatest among the plurality of allowable CMYK color control signal sets (C, M, Y, K), wherein the repeating step executes the several K-fixed allowable CMYK color control signal set-selecting process to select, among the plurality of allowable CMYK color control signal sets (C, M, Y, K), several K-fixed allowable CMYK color control signal sets (C, M, Y, K), whose K value is equal to another fixed value that is decremented by one from the fixed value set by the K value setting step in the latest determining routine.

20. A method as claimed in claim 18, wherein the color reproducible range determining step includes the step of determining a plurality of Lab color points for a plurality of K-fixed CMYK control signal sets (C, M, Y, K) whose K value is equal to the fixed value set by the K value setting process, wherein the judging step judges whether the plurality of Lab color points include at least eight Lab color points that are located in eight spaces, respectively, the eight spaces being defined between the subject lattice point and its neighboring lattice points and surrounding the subject Lab lattice point in the L*a*b* color space.

21. A method as claimed in claim 20, wherein the plurality of Lab color point-determining step determines $256^3$ number of Lab color points for $256^3$ number of K-fixed CMYK control signal sets (C, M, Y, K) whose C, M, and Y values are $256^3$ combinations of all the integers in the range from 0 to 255 and whose K value is fixed to the value set by the K value setting process.

22. A method as claimed in claim 15, further comprising the steps of:
   receiving an Lab color value set indicative of a desired Lab color point in the L*a*b* color space;
   searching the lookup table to determine several Lab lattice points that surround the desired Lab color point;
   retrieving, from the lookup table, several CMYK color control signal sets (C, M, Y, K) corresponding to the determined several Lab lattice points; and
   calculating a CMYK color control signal set (C, M, Y, K) based on the retrieved several CMYK color control signal sets (C, M, Y, K).

23. A device of creating a lookup table indicating a relationship between each lattice point in an input color space and a color signal set in a target color space, the input color space being defined by several color components whose total number has a first value, the target color space being defined by several color-signal components, whose total number has a second value greater than the first value by a difference number and each of which has one of a plurality of discrete values, the input color space being divided into a lattice to define a plurality of lattice points indicative of a plurality of lattice color sets, each lattice color set being constructed from color values of the several color components, a color value of each color component in the lattice color set having one of another plurality of discrete values, the color signal set being constructed from color values of the several color-signal components, the device comprising:
   a portion determining one color signal set for each lattice point in the input color space, a color reproducible range being defined in the input color space and being determined dependently on a value of at least one color-signal component in the determined color signal set, the total number of the at least one color-signal component being greater than or equal to the difference number, the color reproducible range containing the subject lattice point and a color point of the determined color signal set therein, the subject lattice point being the closest to the color point of the determined color signal set within the color reproducible range; and
   a portion setting, for each lattice point, the one color signal set determined for the subject lattice point, thereby creating the lookup table.

24. A lookup table indicating a relationship between each lattice point in an input color space and a color signal set in a target color space, the input color space being defined by several color components whose total number has a first value, the target color space being defined by several color-signal components, whose total number has a second value greater than the first value by a difference number and each of which has one of a plurality of discrete values, the input color space being divided into a lattice to define a plurality of lattice points indicative of a plurality of lattice color sets, each lattice color set being constructed from color values of the several color components, a color value of each color component in the lattice color set having one of another plurality of discrete values, the color signal set being constructed from color values of the several color-signal components, the lookup table being produced by the steps of:
   determining one color signal set for each lattice point in the input color space, a color reproducible range being defined in the input color space and being determined dependently on a value of at least one color-signal component in the determined color signal set, the total number of the at least one color-signal component being greater than or equal to the difference number, the color reproducible range containing the subject lattice point and a color point of the determined color signal set therein, the subject lattice point being the closest to the color point of the determined color signal set within the color reproducible range; and
   setting, for each lattice point, the one color signal set determined for the subject lattice point, thereby creating the lookup table.

25. A method of converting an input color value set defined in an input color space into a control signal set defined in a target color space, the method comprising:
   a step of creating a lookup table indicating a relationship between each lattice point in an input color space and a color signal set in a target color space, the input color space being defined by several color components whose total number has a first value, the target color space being defined by several color-signal components, whose total number has a second value greater than the first value by a difference number and each of which has one of a plurality of discrete values, the input color space being divided into a lattice to define a plurality of lattice points indicative of a plurality of lattice color sets, each lattice color set being constructed from color values of the several color components, a color value of each color component in the lattice color set having one of another plurality of discrete values, the color signal set being constructed from color values of the several color-signal components, the lookup table creating step including the steps of:
      determining one color signal set for each lattice point in the input color space, a color reproducible range being defined in the input color space and being determined dependently on a value of at least one color-signal component in the determined color signal set, the total number of the at least one color-signal component being greater than or equal to the difference number, the color reproducible range containing the subject lattice point and a color point of the determined color signal set therein, the subject lattice point being the closest to the color point of the determined color signal set within the color reproducible range; and
      setting, for each lattice point, the one color signal set determined for the subject lattice point, thereby creating the lookup table;
   receiving an input color value set indicative of a desired color point in the input color space;
   searching the lookup table to determine several lattice points that surround the desired color point;
   retrieving, from the lookup table, several color signal sets corresponding to the determined several lattice points; and
   calculating a color signal set based on the retrieved several color signal sets.

26. A device of converting an input color value set defined in an input color space into a control signal set defined in a target color space, the device comprising:
   is a portion creating a lookup table indicating a relationship between each lattice point in an input color space and a color signal set in a target color space, the input color space being defined by several color components whose total number has a first value, the target color space being defined by several color-signal components, whose total number has a second value greater than the first value by a difference number and each of which has one of a plurality of discrete values, the input color space being divided into a lattice to define a plurality of lattice points indicative of a plurality of lattice color sets, each lattice color set being constructed from color values of the several color components, a color value of each color component in the lattice color set having one of another plurality of discrete values, the color signal set being constructed from color values of the several color-signal components, the lookup table creating portion including:

a portion determining one color signal set for each lattice point in the input color space, a color reproducible range being defined in the input color space and being determined dependently on a value of at least one color-signal component in the determined color signal set, the total number of the at least one color-signal component being greater than or equal to the difference number, the color reproducible range containing the subject lattice point and a color point of the determined color signal set therein, the subject lattice point being the closest to the color point of the determined color signal set within the color reproducible range; and a portion setting, for each lattice point, the one color signal set determined for the subject lattice point, thereby creating the lookup table;

a portion receiving an input color value set indicative of a desired color point in the input color space;

a portion searching the lookup table to determine several lattice points that surround the desired color point;

a portion retrieving, from the lookup table, several color signal sets corresponding to the determined several lattice points; and a portion calculating a color signal set based on the retrieved several color signal sets.

* * * * *